United States Patent

[11] 3,629,833

[72] Inventor Frederick M. Demer
307 Robin Lane, Vestal, N.Y. 13850
[21] Appl. No. 879,450
[22] Filed Nov. 24, 1969
[45] Patented Dec. 21, 1971

[54] CHARACTER RECOGNITION SYSTEM EMPLOYING A PLURALITY OF CHARACTER COMPRESSION TRANSFORMS
3 Claims, 38 Drawing Figs.

[52] U.S. Cl. 340/146.3 H
[51] Int. Cl. G06k 9/04
[50] Field of Search 340/146.3

[56] References Cited

UNITED STATES PATENTS

| | | | |
|---|---|---|---|
| 3,178,687 | 4/1965 | Perotto | 340/146.3 |
| 3,178,688 | 4/1965 | Hill et al. | 340/146.3 |
| 3,196,398 | 7/1965 | Baskin | 340/146.3 |
| 3,506,807 | 4/1970 | Malaby | 340/146.3 X |
| 3,522,586 | 8/1970 | Kiji et al. | 340/146.3 |
| 3,539,994 | 11/1970 | Clapper | 340/146.3 T |

OTHER REFERENCES

Demer, IBM Tech. Disclosure Bulletin, " OCR Vertical Registration System," Vol. 9, No. 10, Mar. 1967, pp. 1367–1370

*Primary Examiner*—Maynard R. Wilbur
*Assistant Examiner*—Leo H. Boudreau
*Attorneys*—Hanifin and Jancin and Paul M. Brannen ABSTRACT: A character recognition system, based upon a low-resolution video scanner, in which the binarized video data from sequential vertical scans is laterally related and registered in a two-dimensional storage.

The data in this storage, a two-dimensional pattern of the character to be recognized, is logically relocated and compacted prior to the application of recognition criteria for the purposes of eliminating the differences in patterns caused by various styles and sizes of the same character; filling data voids resulting from low-density characters; and excluding redundant data derived from heavily imprinted characters. The logical operations (transformations) reduce the patterns to the degree that there is left only that data in each pattern which makes it unique within the array to be recognized, and therefore recognizable by the application of minimum criteria.

*INVENTOR*
FREDERICK M. DEMER
BY Paul M. Brannen
*AGENT*

CHARACTER RECOGNITION SYSTEM EMPLOYING A PLURALITY OF CHARACTER COMPRESSION TRANSFORMS

BACKGROUND OF THE INVENTION

This invention relates to character recognition systems, particularly to those systems designed to operate with multiple type styles and over a wide range of print quality. Such systems conventionally operate with high-resolution scanners, develop large amounts of video data, and rely upon an agglomeration of many small and finely detailed data configurations for recognition.

Such systems are very large and expensive. Moreover, such designs tend to be self-perpetuating and stagnant since the development of recognition criteria has become a statistical exercise for a computer operative against a data sample. Significant advance in the design of character recognition systems requires a departure from the micro criteria and a return to the use of the macro characteristics of characters despite the variations introduced by style and size.

SUMMARY OF THE INVENTION

The design to be described recognizes characters of varied size and style on the basis of the macro characteristics of the video patterns. These characteristics are retained and enhanced throughout a series of data manipulations which reduce and normalize the video patterns derived from the variable input data prior to the application of recognition criteria.

The data manipulations are based on fixed rules which relocate and/or delete specific data bits in accordance with the initial positions of the bits within a two-dimensional electronic storage means. Several data manipulations may follow one another serially each based upon the bit positions resulting from the prior operation, and each with a different set of operating rules.

These operations on the video pattern are all conducted within the same two-dimensional storage means into which the original video data was registered. They result in locating the video patterns modified by then into a fixed number of storage elements at specific locations. Further manipulation of that storage area in conjunction with associated logical circuitry produces recognition.

Although transformations of data have been used in the past for various single purposes in character recognition systems, ranging from pattern improvements such as "defuzzing," line width normalization, and so on, up through alterations of optical images to interference patterns, the present transformation arrangement is considered novel in that it is of the spatial type in which bit changes of the input data are a function of the location of the bit within the pattern, and this type of transformation is arranged to accomplish the following:

1. Standardize the height and breadth of the video pattern.
2. Normalize the pattern variations resulting from multistyle characters of the same identity.
3. Reduce the black bit content of an original pattern but conserve and enhance the distinguishing characteristics of missing-bit patterns.
4. Locate the reduced and transformed pattern in a specific location within a storage matrix.

Accordingly, a principal object of the present invention is to provide an improved character recognition system which will operate with multiple styles of characters and over a wide range of print quality.

Another object of the invention is to provide an improved character recognition system in which the binarized scanning data is transformed by a spatial type of transformation to thereby normalize pattern variations resulting from various style characters of the same identity.

A further object of the invention is to provide an improved character recognition system in which transformation of the binarized scanning data will standardize the height of the output pattern.

Still another object of the invention is to provide an improved character recognition system in which transformation of the binarized scanning data reduces the black bit content of an original pattern but conserves and enhances the distinguishing characteristics of missing good patterns.

Still another object of the invention is to provide an improved character recognition system in which matrix transformation of binarized scanning data locates the video pattern and transform pattern in a specific location within a storage matrix.

Another object of the invention is to provide an improved character recognition system which utilizes two transformations of the scanning data in tandem to thereby standardize the pattern width and to reduce the pattern size with retention of the fundamental distinguishing pattern features upon which human recognition of the characters is thought to be based.

BRIEF DESCRIPTION OF THE DRAWINGS

FIGS. 18*a* and 18*b* show the location of bits for the letter D. FIGS. 18*c* and 18*d* show a number of bit combinations used to supply inputs to the recognition logic.

Similar reference characters refer to similar parts in each of the several views.

GENERAL SYSTEM DESCRIPTION

Figure 1:
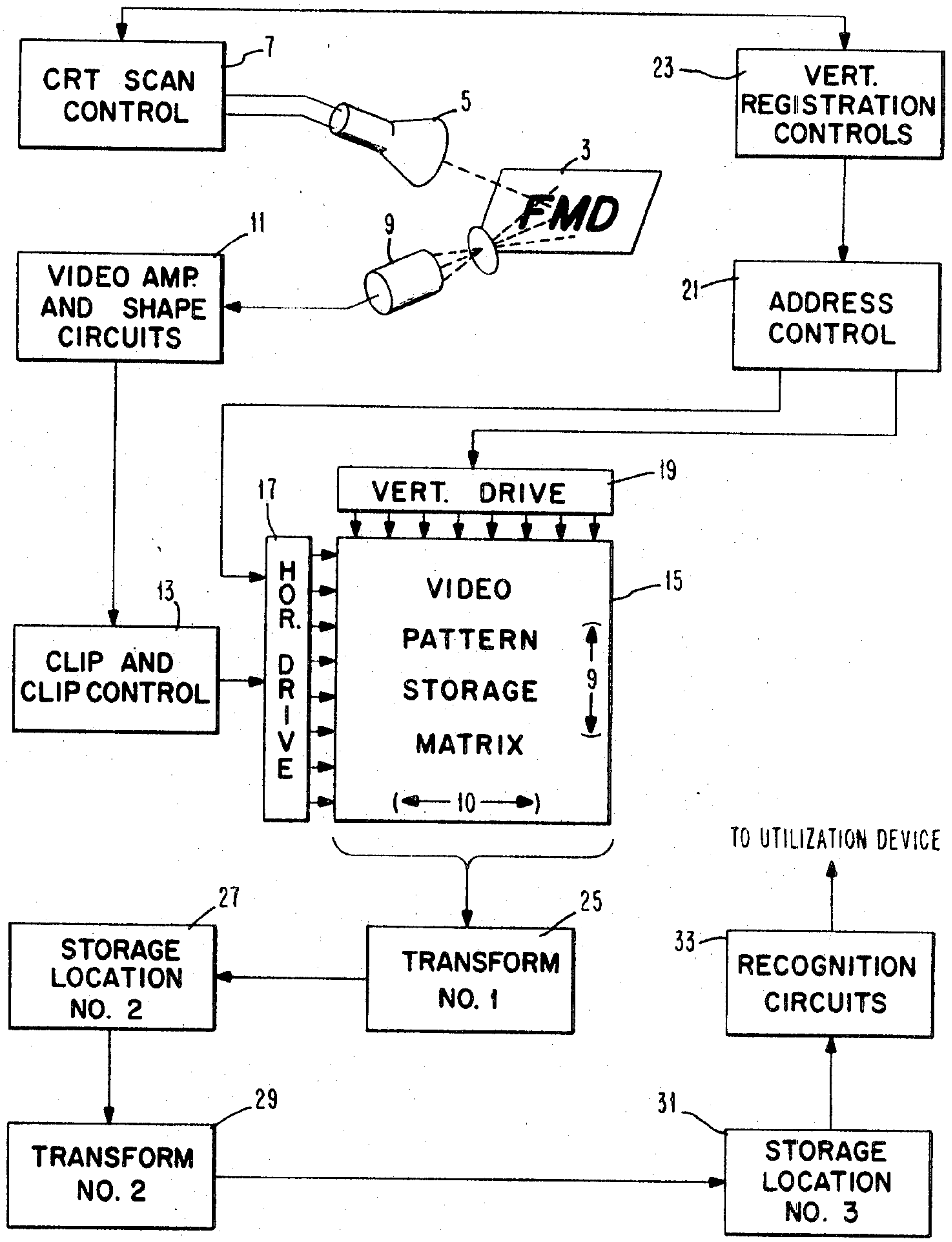
FIG. 1 is a simplified schematic diagram of a character recognition system arranged in accordance with a preferred embodiment of the invention.

FIG. 1 of the drawings illustrates in highly schematic form the basic features of a character recognition system which embodies the present invention.

The characters to be scanned such as the letters shown on the document 3, are moved past a scanning station by suitable document transport means, not shown, since it shows no part of the present invention. At the scanning station, the characters to be recognized are scanned by a conventional flying spot scanner including a suitable cathode-ray tube 5, governed by cathode-ray tube scan control circuits 7 to produce a suitable scanning raster. The video data produced by the scanning of the character is formed as a result of the reflected light being supplied through a suitable lens system to a photomultiplier tube 9 or other photoresponsive device which supplies video signals to video amplifying and shaping circuits 11, from whence they are supplied to clipping and control circuits 13. The binarized video signals are then supplied to the video pattern storage matrix 15, where the information is entered at suitable locations as a result of the operation of horizontal and vertical drives 17 and 19, respectively, which in turn are under the control of address control circuitry 21 and vertical registration controls 23.

The binarized video signals in the video pattern storage matrix 15 are transformed in accordance with a predetermined set of rules or conditions so that the information located at various points in the video pattern storage matrix is combined and/or moved to have a different spatial relationship to the remaining information. This operation is performed by suitable circuitry indicated generally by the block 25, designated as "transform 1." In actual practice the transform circuits may comprise a plurality of conventional logical operation circuitry. After the transformation has been performed, the transformed video data is again stored at suitable storage locations 27, also designated as "storage location 2." This storage location 2 may actually comprise either a separate storage means, or may constitute particular locations in the storage matrix 15. From the intermediate storage location 27, a second transform operation can be provided by circuitry 29, also designated as "transform 2" from whence the data is supplied to a further storage location 31, also designated as "storage location 3." From a temporary storage 31, the data is supplied to recognition circuits 33, which may comprise conventional logic circuits arranged to provide particular output depending on the patterns of data supplied thereto, to thereby indicate the value of the character which has been scanned. From the recognition circuits 33, the outputs indicating the particular characters may be supplied to any suitable utilization device, not shown, since it forms no portion of the present invention. The storage location 2 and storage location 3, reference characters 27 and 31, respectively, are shown in FIG. 1 as separate storage means aside from the video pattern storage matrix 15. Although in actual practice separate storage locations may be provided physically, it is contemplated to use the 9×10 storage matrix 15 for receiving the data after the first and second transformations have been carried out.

Figure 2A:
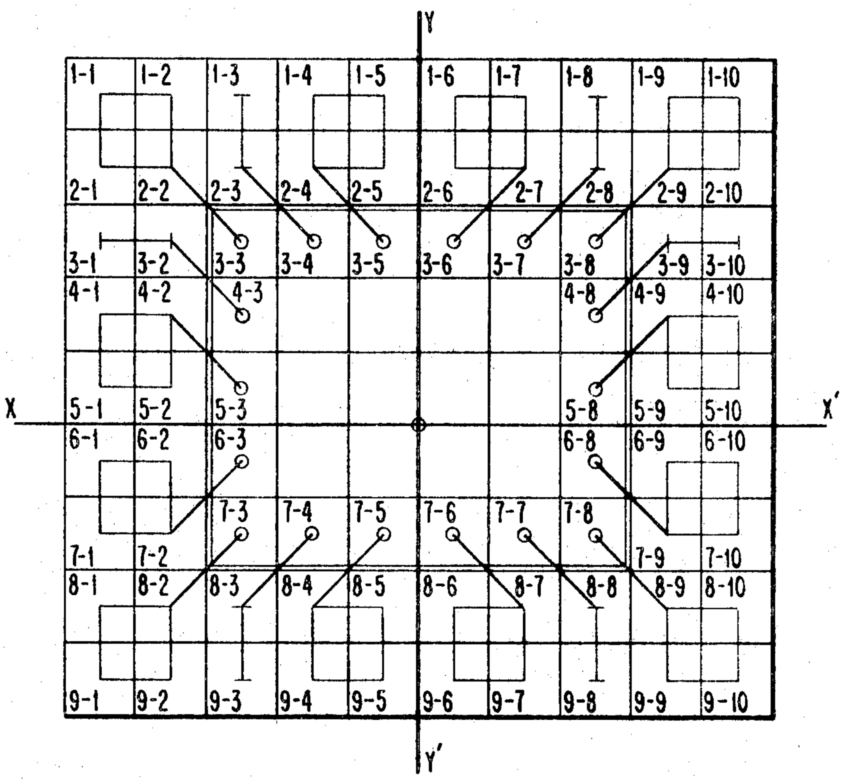
FIG. 2*a* and FIG. 2*b* are symbolic diagrams showing the manner in which information present in selective locations of a two-coordinate storage matrix is relocated to other locations according to predetermined rules.
Figure 2B:
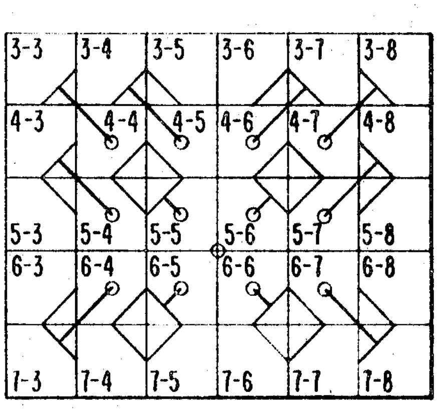

FIGS. 2a and 2b are illustrative illustrations of the manner in which the data is transformed in a system such as shown schematically in FIG. 1.

Two diagrams are shown, both of which are required to define the transform. FIG. 2a shows a full-size drawing of the 9×10 matrix in which the original video bit pattern is stored. The double lines define a 5×6 central section which is to be used as storage location 2, in which the first transform of the original pattern will be located. FIG. 2B shows the 5×6 central section of the matrix separately for descriptive purposes.

Both diagrams are meant to indicate the final location of bits in storage location 2, and the initial location of bits from which they were derived. In the upper left-hand corner of the FIG. 2a, for example, the 1—1, 1-2, 2-1, and 2—2 bits of the original pattern are all traversed by a square from which a line leads diagonally downward to end in a circle in position 3—3, the first in storage location 2. This is to indicate that any or all bits originally found in 1—1, 1-2, 2-1, and 2—2 result in a single bit in 3—3. FIG. 2a similarly indicates the source of all bits which will occupy the bits in the perimeter of storage location 2.

FIG. 2b provides similar information as to the location and source of the remaining bits in the transformed pattern. Examples: 4—4 results depends upon a bit condition of 3—3 in the original pattern; 4–5 depends upon 3–4 and 3–5 in the original, and 5—5 will be black after transform, if any or all of the bits 5—5, 5–4, 4–5, and 4—4 were originally black. It should be noted that these operations consolidate or condense 90 of the possible bits in the original pattern into 30 possible bits of the transformed pattern.

The actual process of the transformation is invariant for all characters (if a single version of the transform is used). It will be accomplished by logical operations on a storage consisting of binary elements. It proceeds from inside outward, i.e., positions 5—5, 5-6, 6–5, and 6—6 will be set in accordance with their original pattern conditions and those of the surrounding bits 4—4, 4-5, 4–6, 4-7, 5-7, 6–7, 7—7, 7–6, 7-5, 7-4, 6–4, and 5–4. The latter will then be reset to white and selectively turned on in accordance with the conditions in the bits surrounding them. This operation is repeated until the transform is accomplished and the transformed pattern stands in the 5×6 central area of the 9×10 matrix.

A general statement as to the effect of Transform 1 upon the original pattern may be made by an examination of FIGS. 2a and 2b. Groups of bits in the original pattern are combined into one bit in the result. Since the original pattern contains a possible 90 bits, and the resultant has a maximum of 30, the average reduction or consolidation is in the ratio of 3:1.

FIGS. 2a and 2b indicate that the resultant bit in the output pattern has also been translated or shifted from the initial location of the group from which it was derived. These translations are in all cases directed roughly radial the intersection of the axes shown in FIG. 2a and indicated by a dark circle in FIG. 2b.

The net effect of the reduction and the translation may be interpreted as analogous to an optical demagnification of the original image. The output pattern will be a reduced and distorted version of the input pattern.

The distortions of output pattern are deliberate and purposeful. They are the means whereby a variety of original patterns (resulting from multistyle characters of the same identity) may be normalized into a single pattern prior to the recognition function. The normalizing distortions introduced into Transform 1 are as follows:

1. Characters with side strokes sloping either outward or inward in the original pattern will have vertical side strokes after transformation. This is a requirement for multistyle versions of characters M, N, W, (,), and numerals 4 and 5.

The same provision will strip serifs from those styles in which the serifs are short to moderate in length, such as the IBM pica-72, Advocate, and Delegate.
2. Outer curved segments of characters will be compressed into straight lines on the perimeter of the transformed pattern. Multistyle characters such as C, G, B, D, U, and numerals such as 2, 3, 5, 6, 8, 9, 0, are thus normalized with respect to curvature of segments.

It should be noted that the normalization operations 1 and 2 are advantageous only if certain limits are observed. The sloping strokes in the letter A, for example, should not be made into verticals since this would destroy a basic attribute of the letter. FIG. 2*a* indicates that an arbitrary (and not necessarily optimum) limit has been set by the design. It is implemented by the OR condition which is indicated as existing between the corresponding bits in rows 1, 2, and 8, 9, and between corresponding bits in columns 1, 2, and 9, 10. Operations 1 and 2 are therefore limited to those bits which fall within these boundaries in the original pattern.

There are two other normalizing operations produced by the transform:

3. Horizontal character strokes which are intermediate between top and bottom of the character are shifted to either row 3 or row 4 of the output pattern. Reference to FIG. 2*b* indicates that the bits of horizontal strokes which fall in either row 6 or row 7 are shifted into row 6 (row 3 of transformed pattern). Similarly, bits in either row 4 or 5 of the original pattern are shifted into row 5 (row 4 of the output pattern). The letters E, F, and H are examples of the first condition; A, G, and sections of Q are in the second category.
4. Slant strokes extending across the character width are retained as slant strokes by the transformation but are distorted at either end if the bits comprising them do not extend along the 9×10 matrix diagonals.

These four types comprise the normalizing alterations accomplished by Transform 1.

One of the objectives for Transform 1 is the normalization of the video patterns resulting from different styles of characters having the same identity. The degree to which this objective is met by Transform 1 will vary with the identity of the character; it is not possible to describe it quantitatively for any of the characters.

The transform patterns are different for various styles of each letter to a lesser degree than the original patterns. In all of them, however, the basic characteristics are to be found, recognition is based upon these characteristics as will be later described.

These basic characteristics of the transform patterns are invariant to a high degree under the conditions of both missing and extraneous bits in the original video pattern.

The tolerance of Transform 1 for missing bits is implicit in FIGS. 2*a* and 2*b*, but it is difficult to visualize.

It may be noted that:

1. Any column of the transform (a "vertical" stroke in the transform) will result from several specific configurations of five black bits in any column of the video pattern.
2. Any row of the transform (a "horizontal" stroke) will be completed by any of multiple configurations of six black bits in any row of the video pattern.

Tolerance for "noise" in any character recognition system will vary with the character identity, and with the style of the character. The variation with character identity is due to the intrinsic variations in "uniqueness" which exists in the shapes of the characters as originally chosen, O vs. Q and O vs. X, for example. Various styles of the characters may further alter the degree of uniqueness.

These intrinsic character differences are subject to modification by the resolution employed in the scanner, and the binarization ("clipping" level) of the scanner data. The estimation of noise tolerance in a conventional system is so uncertain that experienced personnel resort to the scanning of character samples (inevitably with an uncertain and significant sampling error) prior to final determination of resolution and recognition circuitry design.

It has been previously emphasized that the system herein described will significantly reduce noise pickup by the use of low scanner resolution, and that this is made possible by the high tolerance of the system for "missing" bits. Some indication of the tolerance of Transform 1 for noise, however, remains as a requirement for this description.

The black bits in a video pattern which are extraneous to the idealized video pattern are usually termed noise. This is a misuse of the term to some degree, since noise implies a randomness of occurrence which the extraneous bits in a video pattern do not markedly exhibit.

There is a random component of noise which has the document as an origin. Paper discolorations, variant fiber density or "loading," occur infrequently and randomly with respect to character locations on the paper. This component is small in comparison with that which originates in the impact printing process.

In this process an ink-bearing fabric ribbon is driven against the paper by variously shaped printing elements, and ink is deposited on the paper in those areas which sustain the impact. Ribbon areas other than those directly driven by the print element also contact the paper. These ribbon areas contact the paper with various velocities and at times subsequent to the print element impact. Ribbon compliance and density, print element velocity and mass, and the platen and paper characteristics, are minor determinants of the undesired ribbon area contacts; the major determinant is the contour of the printing element.

The locations of these extraneous bits which result from the printing process are in close proximity to the valid bits. The boundaries of character segments (as defined by valid bits) are thereby made irregular, and increased in width. This degradation of the video pattern is the result of degradation of the character as printed on the document. The "clean" appearance of characters typed with a carbon ribbon when compared with those typed with an ink ribbon indicates that it exists.

Scanners used in OCR have two characteristics which add extraneous bits in the same locations, and which are indistinguishable from those derived from the printing process. In a conventional CRT flying spot scanner these are:

a. The random lateral relationship between the vertical scan path and the vertical character segments, and
b. The random relationship of the sampling periods during a vertical scan, and the encounter of the beam with horizontal character segments.

The bits in the video pattern of a curved character segment will have adjacent bits which may be caused by either *a* or *b* or by the combination.

A tolerance for video patterns with excessive character segment widths, and irregular boundaries, would therefore seem to be a valid indication of a high tolerance for noise. Such tolerance is found in the present system.

TRANSFORM NO. 2

The purpose of Transform 2 is to reduce the complexity and component count of the recognition circuitry. Transform 2 accomplishes this by a further consolidation of the output pattern of Transform 1 prior to analysis by the recognition circuitry.

Transform 2 operates to: (1) remove redundant (i.e., repeated) columns of the Transform 1 pattern; (2) consolidate certain pairs of pattern columns; and (3) analyze, and subsequently remove, all-black columns of data in two specific locations. These operations of the transform are accomplished by a dual usage of the circuitry required for vertical registration of the original video data within the storage matrix. Additional circuitry for the control of the operations is required since various columns of the input patterns are subject to one or none of the three operations.

The circuitry provided for the vertical registration of raw video data in the storage matrix to be subsequently described in detail, makes each of the 10 columns of the matrix operable as a downward shift register.

The addition of selectively operable circuits between the row 9 and row 1 positions of columns 3–8 makes possible the following operations on the columns containing the input pattern to Transform 2.

a. Circulation of Column Data. The application of nine shift pulses to any column will (with rows 9 and 1 connected) shift the column downward to row 9, thence to row 1, and downward from row 1 into the original position. This operation will be used to compare the bit contents of columns.

b. Consolidation of Column Data. The data in two columns may be consolidated into one if nine shift pulses are applied to both columns with the nine row positions ORed together into the row 1 position of one column. This operation leaves one of the two columns in an all-white condition, and the other containing its original black bits plus those from the second which were in dissimilar row positions.

c. Deletion of Column Data. Any pattern column may be reset to an all-white condition by blocking the row 3 position after the fourth shift pulse.

d. Transfer of Column Data. Any pattern column may be transferred to any other by the application of nine shift pulses to each of them with the row 9 position of one connected to the row 1 position of the other.

The input to Transform 2 (Transform 1 output) may be 3, 4, 5, or 6 columns in width. The function of the control circuitry for Transform 2 is to apply the operations listed on the previous page so as to reduce the 4, 5, and 6 column input patterns to a standard width pattern 3 columns wide. The operations whereby the reduction is accomplished are necessarily sequential, and occur in one of two stages.

STAGE 1 OF TRANSFORM 2

Stage 1 consists of two operations: A determination of the width of the input pattern, and the deletion of any all-black columns which are lateral boundaries of the pattern.

The controls for these two operations are seven circuits to be called Column Elements. These are bistable devices associated with matrix columns 3, 6, 7, and 8. They are actuated by 5-way AND circuits, one branch of which is connected to each of the five positions in the matrix column. Four of the Column Elements carry a *b* designation (for black) and are associated with columns 3, 6, 7, and 8. Three Column Elements are designated *w* for white and are associated with columns 6, 7, and 8. The *b* Elements are "set" when all bit positions of their associated columns are black; the *w* Elements when all associated bit positions are white.

The positions of Column Elements 6*w*, 7*w*, and 8*w*, are used to determine the input pattern width. All input patterns start at matrix column 3 and hence, if 6*w*, 7*w*, and 8*w* are in the set condition, the input pattern is three columns wide. Similarly, 7*w* and 8*w* in the set condition indicate a 4-position pattern; 8*w* only in set condition indicates a 5 column pattern; none set indicates a 6 column input.

The *b* Column Elements are used to delete all-black columns from the input pattern if they are lateral boundaries of the pattern. Column Elements 3*b* and 8*b* invariably cause the deletion of their all-black columns. Elements 6*b* and 7*b* will cause the deletion of their associated all-black columns, if those columns are the rightmost columns of the pattern, or second from right (as indicated by the conditions of the *w* Elements). In the latter case, the Elements 6*b* and 7*b* will cause the deletion of their own columns and that column adjacent on the right.

STAGE 2 OF TRANSFORM 2

Stage 2 operations make the final reduction of the input pattern to three columns in width. The required reductions are made by either a deletion of duplicate columns in the pattern, or by consolidations of two columns into one. The deletion of duplicate columns will be the first mode of reduction applied to the pattern and will be followed by column consolidation with both operations applied on an as-required basis.

The number of column reductions required during Stage 2 will be variable. It depends upon the original number of columns in the input pattern (ad indicated by Column Elements) and the number of all-black columns (indicated by *b* Column Elements) which have been deleted during Stage 1. The required reduction will range between none and three columns as a maximum.

No further reduction is required in four of 10 possible cases; one column in three cases, two columns in two cases, and the maximum of three in one case only. Logical statements with respect to conditions of the *w* and *b* Column Elements may be readily implemented to determine in which of the four classes any specific input pattern belongs. As examples, the two statements for the class requiring a reduction of two columns are: 8*w* and not 6*w*, 3*b*, 6*b*, and 7*b*, (original width five columns, no black columns deleted) or 3*b* and not 6*w*, 7*w*, 8*w*, 6*b*, 7*b*, and 8*b* (original width of six columns with one deletion).

Columns 4, 5, and 6 are inspected for adjacent duplicates and possible deletion. The additional circuitry required for the comparison of the bit content of these columns consists of six bistable circuits, one group of three is associated with columns 4 and 5 and the other group with columns 5 and 6. Two units of each group are connected by AND circuitry of the seventh row positions of the columns 4 and 5 and 5 and 6. One of the two is connected so as to "set" when both positions are white; the second so as to set when both positions are black.

The third unit of each group (Duplicate 4–5 and Duplicate 5–6) is provided as a final indication of duplicate bit configuration in columns 4 and 5, and 5 and 6, after four steps of the circulation operation have been applied to columns 4, 5, and 6. At this time in the operation the conditions of the duplicate units may be logically combined to indicate the potential reduction of columns because of duplication. The logical statements are: 6+5=4, there is no reduction; 6+5=4, there is one column reduction, column 4 may be deleted; 5+4=1, there is one column reduction, column 5 may be deleted; 6=5=a0, there are two columns reduced, 5 and 4 may be deleted.

If the potential reduction is equal or less than that determined as required, the potential reduction is accomplished by blocking the appropriate row 3 positions prior to the fifth shift pulse. If this reduction is insufficient, the required reduction is accomplished by column consolidation.

Column reduction by consolidation has a maximum requirement of three columns (original pattern six columns, no all-black columns or duplicates), but the required reduction may also be two columns, one, or none. The columns consolidated are fixed in accordance with the reduction required:

| | |
|---|---|
| reduction of 3 cols. | 3+4, 5+6, and 7+8 (no *b* element set) |
| reduction of 2 cols. | 5+6, and 7+8 (Col. el. 3*b* set) |
| | 3+4, and 7+8 (Col. el. 3*b* not set) |
| reduction of 1 col. | 5+6 (if two *b* elements set) |
| | 7+8 (if 3*b* only is set) |
| | 3+4 (if 6*b*, 7*b*, or 8*b* only is set) |

The consolidation operation is most economically implemented, if it follows the deletion of duplicate columns. Additional circuitry would permit it to be synchronous with the reduction by duplication during the last five shift pulses, if all columns of the pattern are simultaneously circulated.

RECOGNITION CIRCUITRY CONSIDERATIONS

In conventional OCR systems the complexity and the component count of the recognition circuitry is indicative of the recognizable array and/or the multistyle capability of the system. This relationship stems from the necessity for providing a "signature," or a reference of some type within the recognition section for each character of the recognizable array, and for each acceptable variation of each character in the array. The complexity and component count of recognition circuitry in conventional systems is therefore proportional to the product of recognizable array size and the acceptable number of character styles.

The introduction of pattern transforms breaks this relationship in two ways: video patterns are reduced and simplified to the point where only the characteristics essential for recognition are retained; the differences between various styles of the same character are reduced or removed. The componentry required per signature is significantly reduced by the first, and the number of signatures required by the second.

Transformlike manipulations of the data beyond those described might be used to further diminish recognition circuitry requirements. At some undetermined point, however a break-even point will be reached between the additional circuitry required for control of the transform and that required for multiple signatures. In this description it will be assumed that this point has been reached with Transform 2.

The recognition circuitry to be described demonstrates the use of multiple signatures to the point that a wide range of style variations are recognizable.

The first operation of recognition (or the last of Transform 2) is the collecting of the scattered rows of data comprising the output of Transform 2.

The most economical location for the three columns which must be analyzed for recognition is columns 6, 7, and 8 of the storage matrix. The collection of the three remaining data columns is accomplished by operation *d*, previously described. Column Elements 6*w*, 7*w*, 8*w*, 6*b*, and 7*b* are reset prior to the start of the data transfer operation. Elements 3*b* and 8*b* remain in the condition taken at the start of Transform 2.

The 6*w*, 7*w*, and 8*w* elements are reset each time a column is transferred and their changing conditions are used to control the transfer. For example, if at the start of the transfer 7*w* is not set, and 8*w* is set, the first column to be transferred is column 7 into column 8. At the conclusion of this transfer, 8*w* will not be set, 7*w* is set, and 6*w* may or may not be. If 6*w* is set, the next transfer indicated is that of column 5 into 7, followed by column 4 into 6. If 6*w* is not set, column 6 is transferred into 7, and the last column to be transferred will be either column 5 or 4 into 6. In any event, the transfer followed by the condition that 6*w*, 7*w*, and 8*w* are all in the nonset condition is the last required. At this time the 6*b* and 7*b* elements will assume a condition indicative of all black bits in their respective columns, a circumstance which is useful in the recognition circuitry.

The recognition circuitry used with the three data columns now located in column positions 6, 7, and 8 is extremely simple in concept. A bistable circuit (Recognition Element) representing each of the characters in the recognized array is the basic requirement. Each of these Recognition Elements is allowed to set at the end of data transfer time, if actuated by a multibranch AND circuit. The branches of the AND circuit are each connected to one position of the storage matrix in columns 7, 8, and 9. The connections may be either to the white or black side of any matrix unit in accordance with the signature of the character represented by the Recognition Element to which the circuit is connected. Characters may be given multiple signatures in order to extend the range of recognizable styles. Two or more multiple branch AND circuits ORed together prior to the Recognition Element permit the use of multiple signatures.

Component economy, and the reduction of drive requirements to a reasonable level requires modification of the circuitry described above. Certain bit combinations are common to many of the character signatures. These combinations would be ANDed into driver units with capacity suitable for the drive of multiple Recognition Element input circuits. Each Recognition Element input circuit is some combination of bit conditions, bit combination drive outputs, and the Column Elements 3*b*, 6*b*, 7*b*, and 8*b*. The condition of all these elements is established at the completion of the data transfer operation, and the time required for the actual recognition of a character is thus only the pickup time of a Recognition Element.

The use of Transform 2 may be omitted and recognition circuitry other than that described previously may be applied directly to the output of Transform 1.

The output of Transform 1 for various styles of the same character varies in width and in location within the storage area, but it is highly unlikely that the patterns will be defective because of missing or extraneous bits. Under these circumstances it is proposed that the well-known "Lakes and Bays" be the recognition criteria used.

It may be remembered that bays are further classified with respect to their orientation within the pattern, i.e., top, bottom, left, or right and that lakes are designated as "upper" and "lower," if two exist within the pattern. The logic whereby these characteristics are determined is basically simple, and few multiple signatures are required.

The circuitry provided for vertical registration (whereby columns of data may be shifted downward within the storage matrix) is ideal for determining the existence of lakes and bays, since it permits the vertical scanning of the pattern columns serially, in series-parallel, or in full-parallel. Variations in recognition circuitry are thus possible in which complexity and cost are inversely proportional to operating time.

The basic circuitry required is a bistable storage element for each type of bay and lake, multiple-branch AND circuits whereby combinations of these may be gathered into character signatures, and a bistable circuit element representative of each character of the recognizable array.

The existence of lateral bays is determined by the comparison of the like-position bits in two or more adjacent columns. If the pattern scan proceeds from right to left, a white-to-black sequence indicates a left bay, and a black-to-white sequence a right bay. Top and bottom bays are determined by a black-white and white-black sequence occurring on the last or first scan steps, respectively.

Lakes are most readily determined by columnar data sequences. A minimum lower lake is determined by a black-black-black sequence in a column for the first three scan steps, followed by black-white-black and then by black-black-black. An upper lake has a similar set of circumstances, but on scan steps 4, 5, and 6.

One form of Transform 1 recognition circuitry for one scan mode will be subsequently described.

DETAILED CIRCUIT DESCRIPTION

Figure 3:
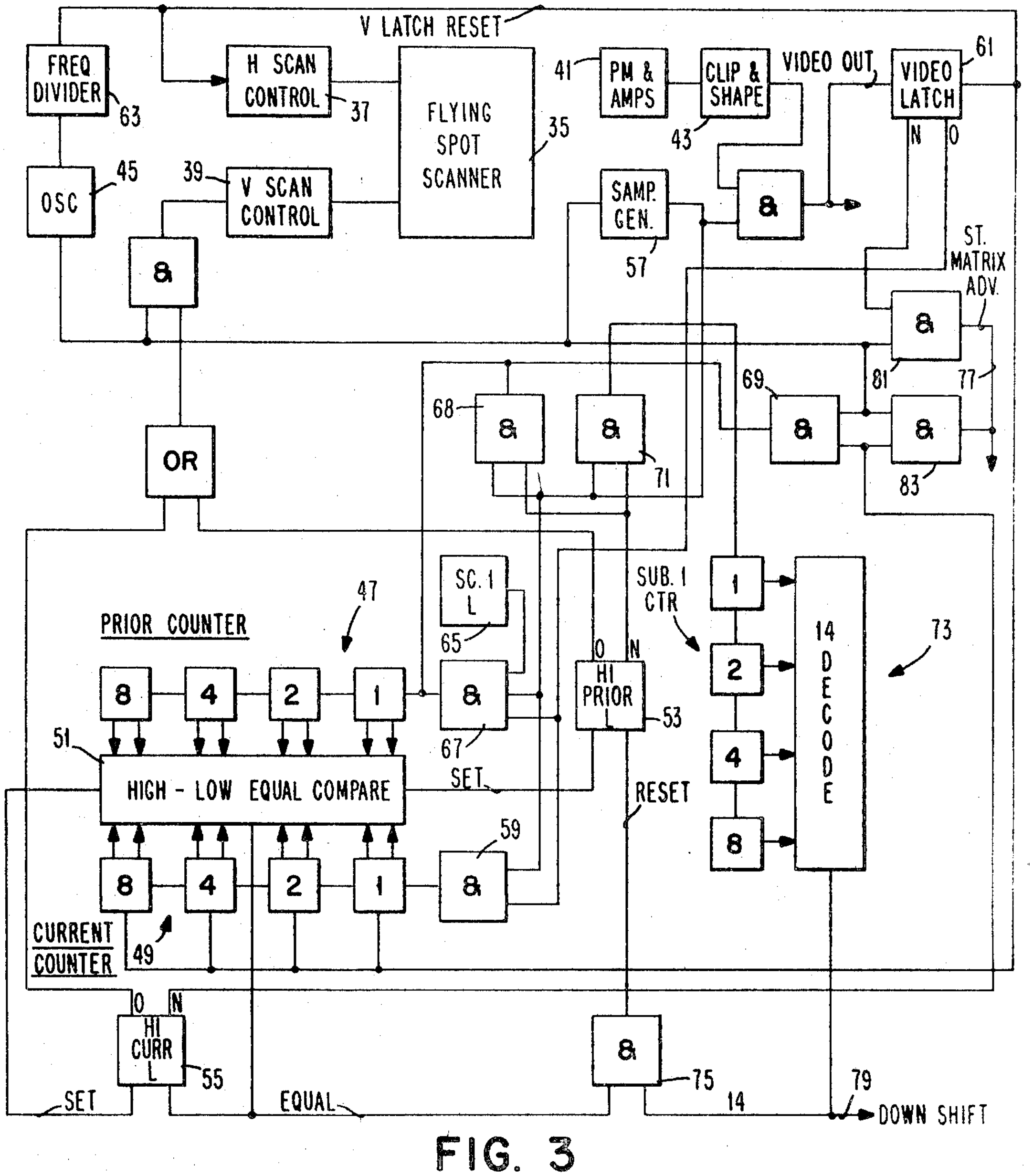
FIG. 3 is a more detailed embodiment showing certain of the controls required for the registration of video data in a two-coordinate storage matrix operation of a system such as shown in FIG. 1.

FIG. 3 of the drawings shows in schematic form one type of vertical registration circuitry which may be employed in the subject invention whereby the video data from each vertical scan may be properly located in a storage matrix relative to the data from all other scans.

The apparatus includes a Flying Spot Scanner 35 of conventional type for scanning the documents, under the control of Horizontal and Vertical Scan Control Circuits 37 and 39, respectively. The Flying Spot Scanner is designed and arranged to employ a Vertical Scan Raster with the unblanked spot traveling downward with respect to the character which is being scanned. The signals resulting from the scanning of the document and the characters are generated by suitable Photomultipliers and Amplifiers 41, the signals from which are clipped and shaped by conventional Clip and Shape Circuits 43. The amplifying, clipping and shaping functions provided by the Circuits 41 and 43 are conventional and well known and need not be described in detail. The vertical and horizontal scan controls may comprise the type well known in the art consisting of a resistive network under the control of a binary counter in conjunction with operational amplifiers proportioned and arranged so that the current flow in the deflection coils of the cathode-ray tube in the Flying Spot Scanner is proportional to the resistive network value as selected by the controls.

The apparatus is under the control of an Oscillator 45 which may be of any suitable type, preferably a crystal-controlled oscillator having associated therewith suitable shaping and power amplification circuitry to serve as the primary source of timing signals for the scanning raster and as a means for generating sampling signals for the video output at specific times during the vertical travel of the scanning beam.

The remaining components illustrated in FIG. 3 have the collective function of controlling the storage matrix address into which bits of video data are placed for storage, and subsequent vertical shifting of those bits within the matrix on an as-required basis to provide for vertical registration of the stored data.

The major components utilized in the vertical registration operation are two binary counters, each having four stages designated as Prior Counter and Current Counter 47 and 49, respectively. Each of these counters has four stages connected in cascade in the usual fashion, and the outputs from the counters are supplied to a Compare Circuit 51, which may comprise a plurality of conventional AND circuits whereby a comparison of values standing in each of the counters will result in either a high prior indication, a high current indication, or an equal indication. The first of these two indications or outputs results in the setting of a corresponding High Prior Latch 53 or a High Current Latch 55. Once these latches are set, they remain in the set condition until reset by an output from the Compare Circuit 51 indicating that an equal count has been determined.

The Current Counter 49 is advanced by pulses supplied from the Sample Generator 57, by an AND-circuit 59, which is governed by the output of Video Latch 61. The first black video bit encountered on any scan sets the Video Latch ON. Thereafter, the output of the Video Latch supplied to AND-circuit 59 will be terminated, so that all sampling pulses during the scan preceding the setting of the Video Latch advance the Current Counter, but pulses occurring thereafter have no effect on the Current Counter. This counter is reset at the conclusion of each vertical scan via a signal on the Line Vertical Latch Reset which is energized from a Frequency Divider 63 in turn supplied with pulses from Oscillator 45.

The Prior Counter 47 is advanced by any one of three sources of advance pulses.

On the first scan of a character a Scan 1 Latch 65 is turned on, and supplies an input to an AND-circuit 67, which has for its other inputs the same inputs as those to AND-circuit 59, so that in this case the Prior Counter will be advanced in synchronism with the Current Counter. The second condition is obtained in which pulses from the Sample Generator 57 are supplied to the Prior Counter via an AND-circuit 69, which is enabled when the High Current Latch is in its set condition.

If the High Prior Latch is set, a third situation exists in which the sampling pulses advance the counter by successive groups of 14 pulses, which is equivalent to subtracting one from the earlier value, until such time as an equal condition exists between the Prior and Current Counters. AND-circuit 68 supplies the necessary pulses to the Prior Counter under this condition. The Prior Counter is reset only upon completion of the scanning of the character. This action is obtained via an AND-circuit 71, which supplies pulses to a counter and decoding circuit indicated generally by reference Character 73, arranged to supply an output after a count of 14 has been reached Under this condition the requirements for AND-circuit 75 are fulfilled, when the high-low equal Compare Circuit 51 indicates an equal condition, and the signal on the output of AND-circuit 75 resets High Prior Latch 53.

The two output signals supplied from the circuitry in FIG. 3 are the Storage Matrix Advance pulses supplied on line 77, and the Storage Matrix Downshift pulses supplied on line 79. The Storage Matrix Advance pulses are operative during each vertical scan subsequent to the first black bit of the scan, as a result of the enabling of an AND-circuit 81 by the Video Latch 61. These pulses advance the vertical address of the Storage Matrix synchronously with the downward progress of the scan so that subsequent black bits in each scan will be stored in accordance with their location along that scan. A secondary function of these signals is to determine the vertical address of the first bit under the condition of the High Current Latch being ON. This condition is provided as a result of the enabling of AND-circuit 83 by the output of the High Current Latch 55.

The Storage Matrix Downshift pulses cause the downward shift within the Storage Matrix of one bit position on each occurrence for all data in one or more of the scans.

Figure 4:
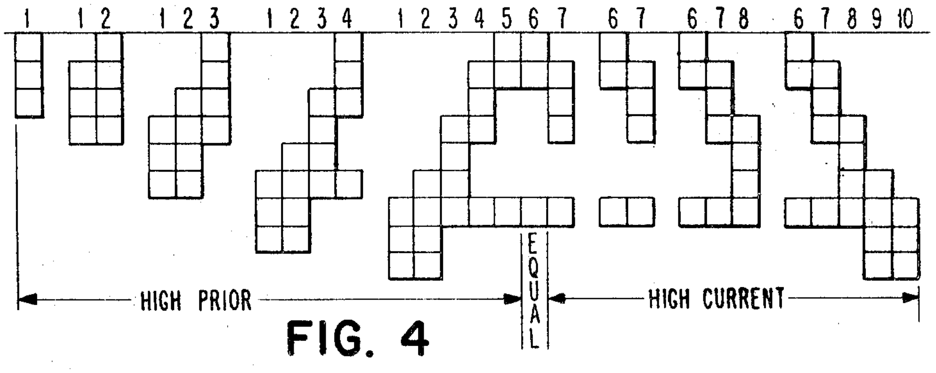
FIG. 4 is a schematic view illustrating the manner in which scanning information moves into a proper position in a storage matrix under controls shown in FIG. 3, for subsequent transformation.

The operation of the circuitry shown in FIG. 3 and described above may be further understood by considering the action taking place during scanning of a character. In FIG. 4, there is shown diagrammatically, the manner in which black bits of video data are shifted in matrix during the scanning of the letter A. The numbering at the top of FIG. 4 designates the various scans, and the block forms show the disposition of the bits which had been encountered as the scans progress from 1 to 10 across the character.

At the leftmost side, the three successive black bits encountered during the first scan are addressed to rows 1, 2, and 3 of column 1 of the matrix. This action occurs by the following operation. The Video Latch is set ON by the first bit of video data. The two following sample pulses time two output pulses on the storage matrix advance line. On all sample pulses during the scan prior to the first black bit encounter, both the Prior and the Current Binary Counters had advanced in synchronism. Let it be assumed that the count has reached a count of 10. In this operation the Prior Counter advance is permitted by the ON condition of the Scan 1 Latch. The advance of the counters is halted by the setting of the Video Latch and the output of the Comparison unit is an equal pulse, which has no effect on this particular scan. At the conclusion of the first scan the Current Counter is reset by the same pulse which advances the position of the scanning beam to its next position.

On the second scan, the first black bit is encountered at one sample interval earlier, that is, higher relative to the character. The scan is blocked and all bits in rows 1, 2, and 3 of column 1 are shifted downward by one position prior to restart of the second scan. The four successive black bits are stored in rows 1, 2, 3, and 4 of column 2 in the matrix. In this scan, the encounter with the first black bit blocked the further operation of the Current Counter at a count of 9. The comparison circuitry provides a high prior output, that is, 9 compared with the 10 standing in the Prior Counter, and this sets the High Prior Latch which blocks further advance of these scan controls. Subsequent sampling pulses advanced the Prior Counter and the Subtract 1 Counter. This advance continues for 14 pulses at which time the 14 Decode Circuitry 73 emits a pulse for possible reset of the High Prior Latch 53. The Prior Counter at this time has in effect had a 1 subtracted from it. It now stands at 9 and the signal on the Equal line together with the 14 Decode Output signal resets the High Prior Latch to halt this operation. The Downshift line 79 was concurrently energized to shift downward the Scan 1 Bits by one position. The resetting of the High Prior Latch permits scan 2 to restart and subsequent black bits are addressed to rows 1, 2, 3, and 4 of matrix column 2. The Current Counter is reset to 0 at the end of the second scan and the Prior Counter stands at the value of 9.

On each of scans 3 and 4, the bits of all the previous scans are shifted downward by two bit positions due to the occurrence of black bits which are two sampling positions earlier than on the previous scan. The setting of the High Prior Latch during each of these scans results in the same action as described above for the second scan, except that two groups of 14 pulses must be added to the Prior Counter before an equal reading takes place. A downshift pulse results from each of these subtraction operations so that the previous data is shifted down by two positions on each of the scans. The downward shift is applied to all data for which successive high prior counts resulted. The Storage Matrix Advance pulse results in proper storage of the fourth bit of the fourth scan, as previously explained.

During scan 5 a further downward shift takes place of all the data by one position. The circuit action is identical with that described for the second scan. At the conclusion of the downshift, the Prior Counter has a value of 4. Its initial value of 10 at the end of scan 1 has been reduced to 9 on scan 2, to 7 on scan 3, to 5 on scan 4, and to 4 at the conclusion of the fifth scan.

On scan 6, the three black bits encountered in this scan are stored under the normal addressing operation of the Storage Matrix Advance pulse in rows 1, 2, and 7 of the matrix. The first black bit of this scan was developed at the same level of the scan as occurred in the fifth scan. The Current Counter, therefore, stands at 4, the same value as that in the Prior Counter. This results in an equal output from the Comparison unit, but this has no effect on the circuitry and the Prior Counter retains the value of 4 at this time.

On the seventh scan the first black bit stops the advance of the Current Counter at a value of 5, indicating that the first bit was encountered one sampling pulse later during the scan. All black bits encountered on this scan require that they be addressed to positions one bit lower than their normal positions. The first black bit encountered in this scan results in a High Current output from the Comparison unit which sets the High Current Latch. With this latch set ON, the scanner is blocked and with the occurrence of the next sampling pulse, the Prior Counter is advanced to 5 and produces a Storage Matrix Advance pulse. The vertical address of the Storage Matrix is thereby advanced by one position as required and the Equal pulse from the Comparison unit then resets the High Current Latch. The scanning operation is resumed and the Prior Counter retains the value of 5 for the next scan.

On each of scans 8, 9, and 10 the bits are addressed to lower than normal storage positions by two bits, two bits, and one bit, respectively. The circuit operation during each scan is similar to that described above for the seventh scan, since in each case a High Current output of the Comparison unit sets the High Current Latch. At the end of scan 10, the value standing in the Prior Counter is 10 and further registration operations are possible. In this case an all-blank scan signals the end of character, which causes a reset of the Prior Counter in preparation for the next character.

The three types of operations described above are sufficient for the registration of any character, since they are operable in any sequence and, of course, for any number of scans.

CIRCUIT COMPONENTS

The circuitry to be described as useful in one embodiment of the invention consists of various units of a particular form of integrated circuitry. The usage of this type of unit has no particular significance from the patent standpoint, since any suitable circuitry could be employed, whether comprising integrated circuitry or circuits involving discrete components.

Figures 5A, 5B:
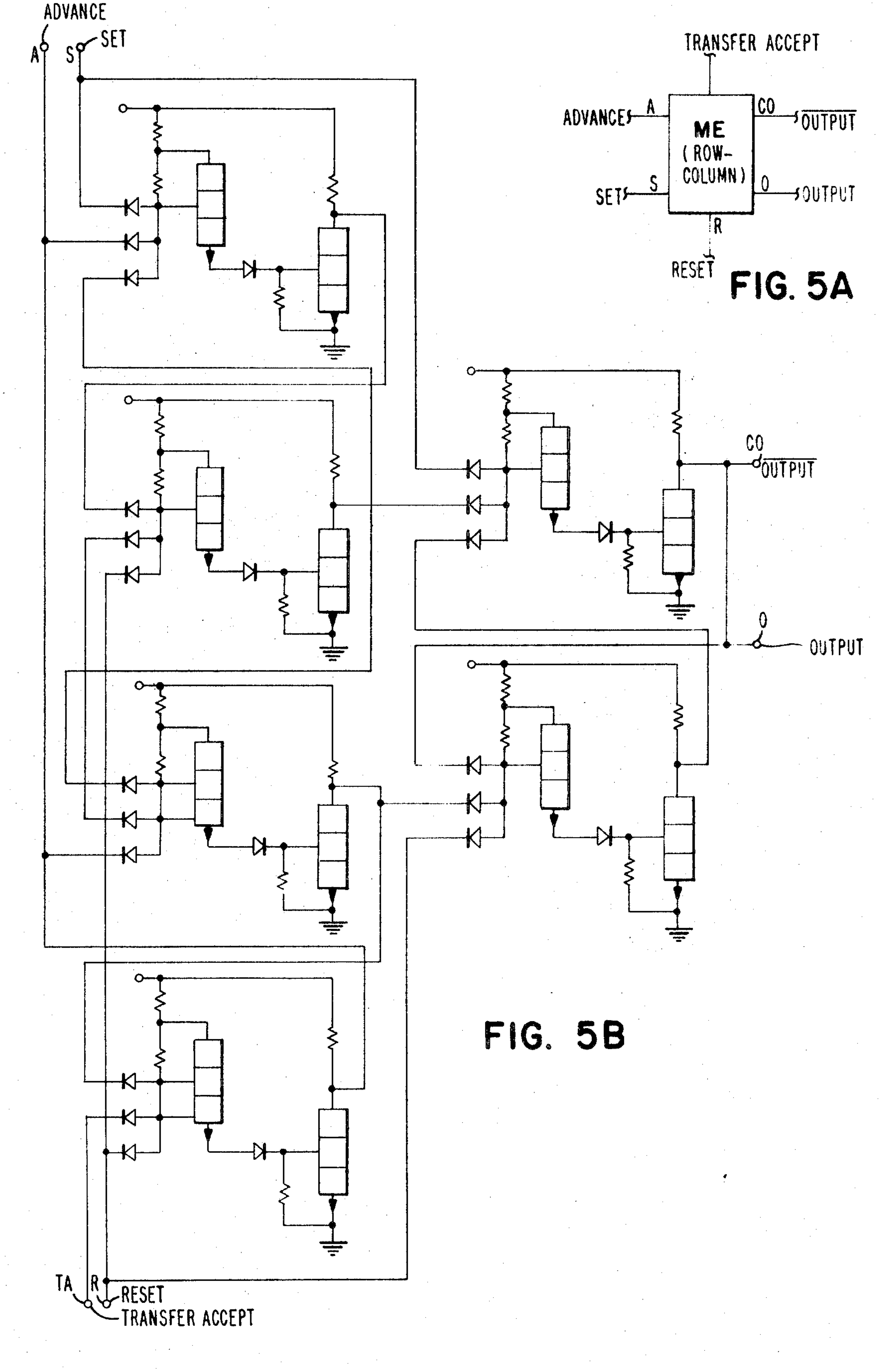
FIGS. 5A and 5B are illustrative of the manner in which one configuration of circuit components may be combined to provide various logic components useful in the present invention.

FIGS. 5A and 5B illustrate the circuitry of the integrated circuit bistable elements. The symbolic symbol is shown in FIG. 5A, consisting of a suitably designated block with input lines having and output lines having specific functions as labeled. The corresponding detailed circuits are shown in FIG. 5B. The four input terminals are: advance, which is also termed clock; set; reset; and transfer accept (data). The advance input requires a positive going pulse from ground to some positive value such as a nominal 6 volts. The set input requires a ground level input and it nominally stands at some positive potential such as +6 volts. The reset is operative under the same conditions as the set input. Transfer Accept is used in conjunction with the Advance input and the unit will be switched on, if Transfer Accept is at the positive value at the time of the Advance or Clock pulse input.

The detailed circuitry shown in FIG. 5B represents the detailed connections of the elements inside a single unit as shown symbolically in FIG. 5A. This circuitry consists of a plurality of transistors and diodes, and it is considered that no detailed explanation need be given, since the particular manner in which the various outputs are achieved under varying input conditions will subsequently be specified, and any suitable detailed circuitry arrangements could be employed that will provide these conditions.

When in the ON condition, the output terminal of the unit is considered to be at a positive potential such as 6 volts and the complementary output terminal is at ground level. In the OFF condition, the situation is reversed and the output terminal is at ground level and the complementary output is at positive potential such as the 6-volt value.

Any one of these units may be utilized as a bit storage element, and may be connected to other elements to act as a shift register or as a binary counter.

In a convenient packaging arrangement, four such elements will be provided per circuit card or carrier. In FIG. 5A the unit is designated as ME for Matrix Element, as used in the 90-element Video Pattern Storage Matrix. This same unit is used elsewhere as a diode matrix driver and as a binary counter.

Figure 6A:
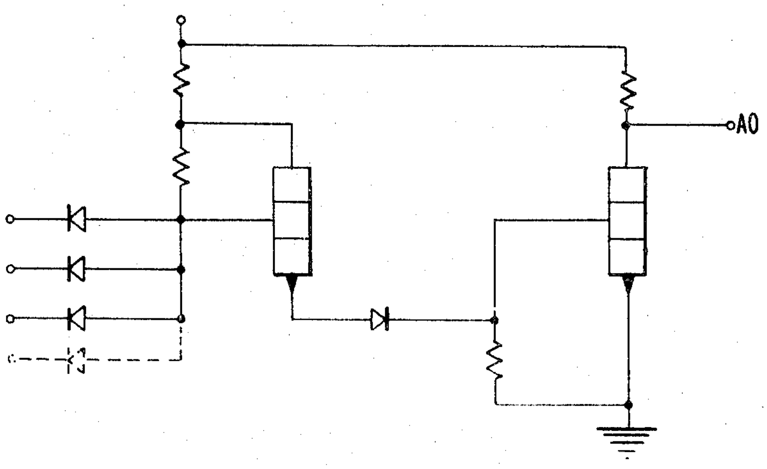
FIGS. 6A, 6B and 6C, and FIGS. 7A, 7B, 7C, and 7D are illustrative of combinations of circuit components for use in still other logical operations.
Figure 6B:
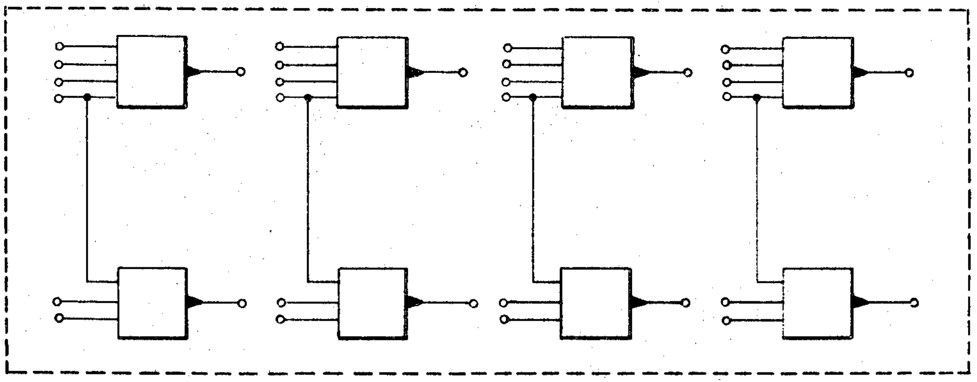
Figure 6C:
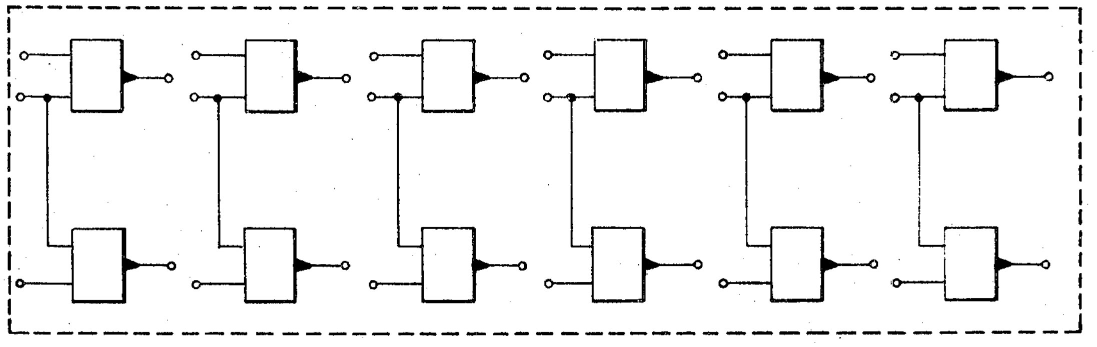
Figure 7A:
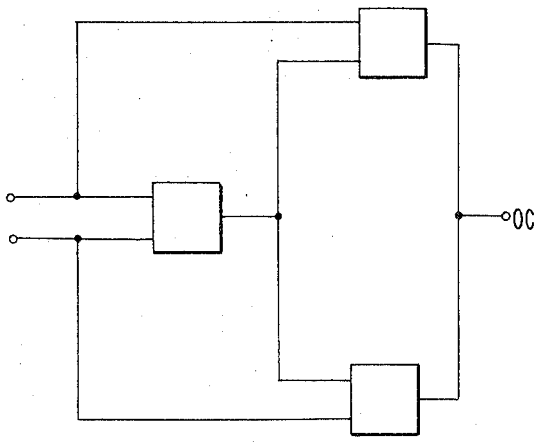
Figure 7B:
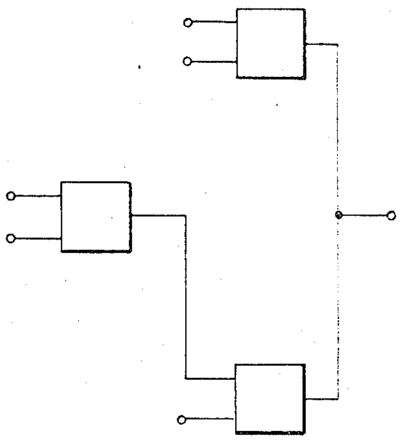
Figure 7C:
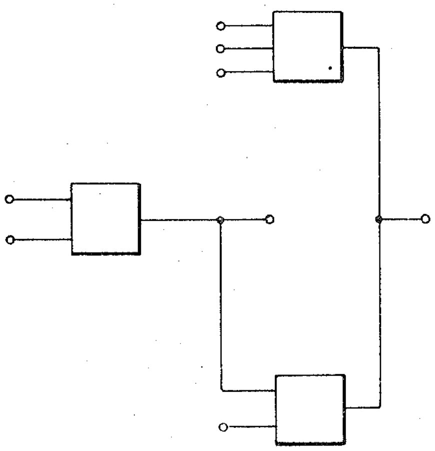
Figure 7D:
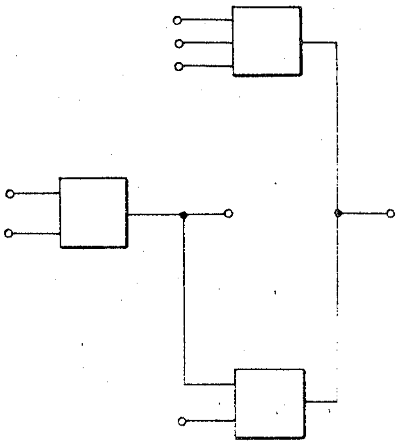

FIGS. 6A—C illustrate the unit circuitry and the makeup of two different plural configurations of AND circuits, which are used in the detailed implementation disclosed herein. The AND circuitry, such as shown in 6A, comprises a conventional diode input configuration, coupled to a first transistor, which is emitter coupled to a second output transistor, supplying an output to the terminal AO as shown. When this configuration is used as an AND circuit, the required input voltages all normally stand at a positive potential such as +6 volts and the output level is at ground. When all of the voltages are removed, then the output level will change to a positive value. As a negative AND circuit, the configuration may be used to provide an OR function in which case any input at ground level will cause the output, which is normally at a positive value such as 6 volts, to fall to ground level. FIG. 6B shows the manner in which a plurality of the circuits shown in 6A may be provided on a single card or package, to carry out a plurality of logic functions. FIG. 6C similarly shows a plurality of AND circuit configurations which may be utilized at various points in the detailed embodiment.

FIGS. 7A—D show the circuit card and the external connections thereto which may be used as a Comparison unit in the operation of the second transform. If the similar position bits in the two columns under comparison are alike, the output hub of the circuit such as OC in FIG. 7A will be at a positive potential, such as 6 volts. If the bits are unlike, then the output voltage at OC will be at ground level.

VIDEO BIT INSERTION MATRIX

Figure 8A:
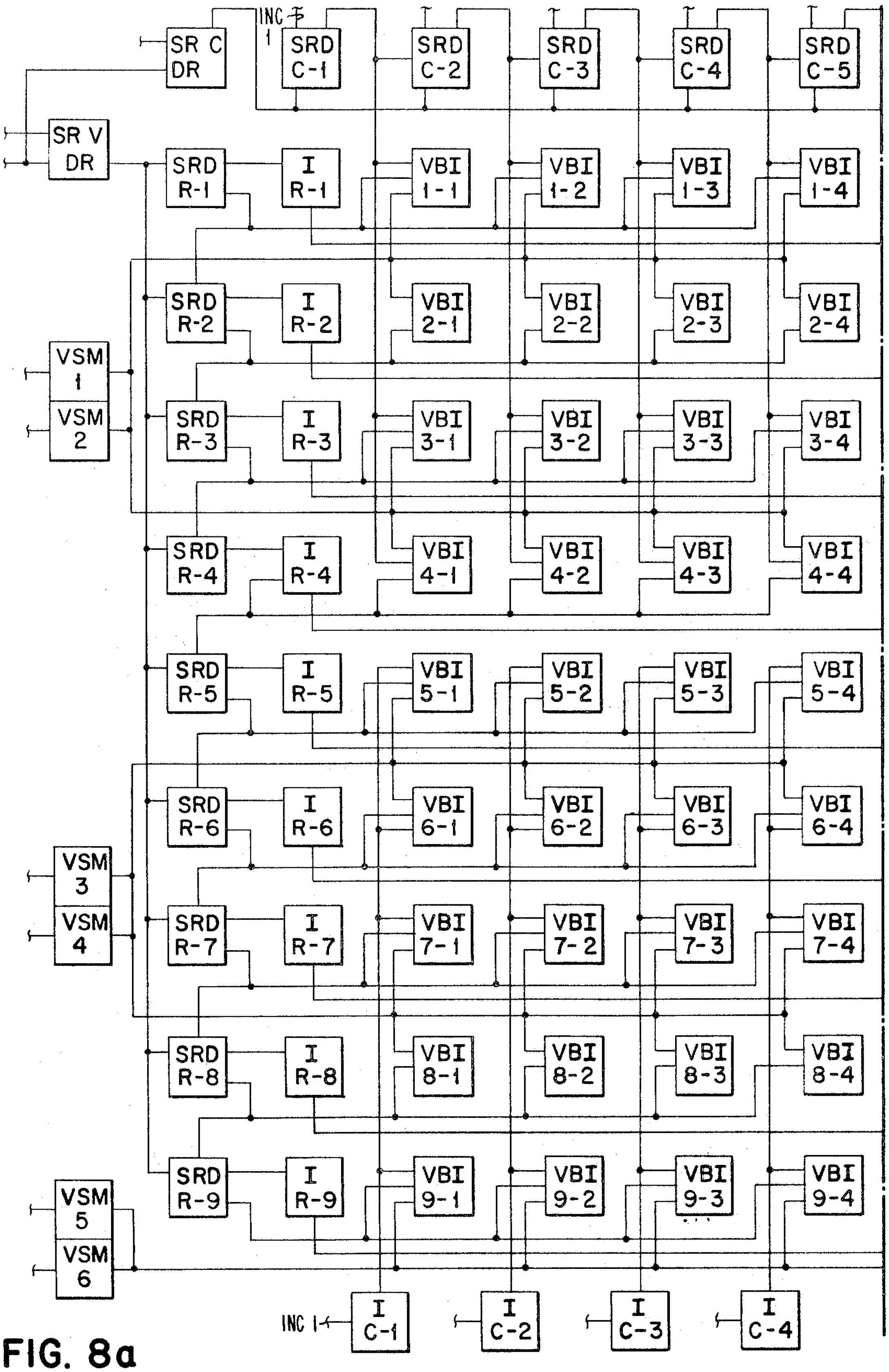
FIGS. 8*a* and 8*b* illustrate a video bit driver matrix utilized in the present invention.
Figure 8B:
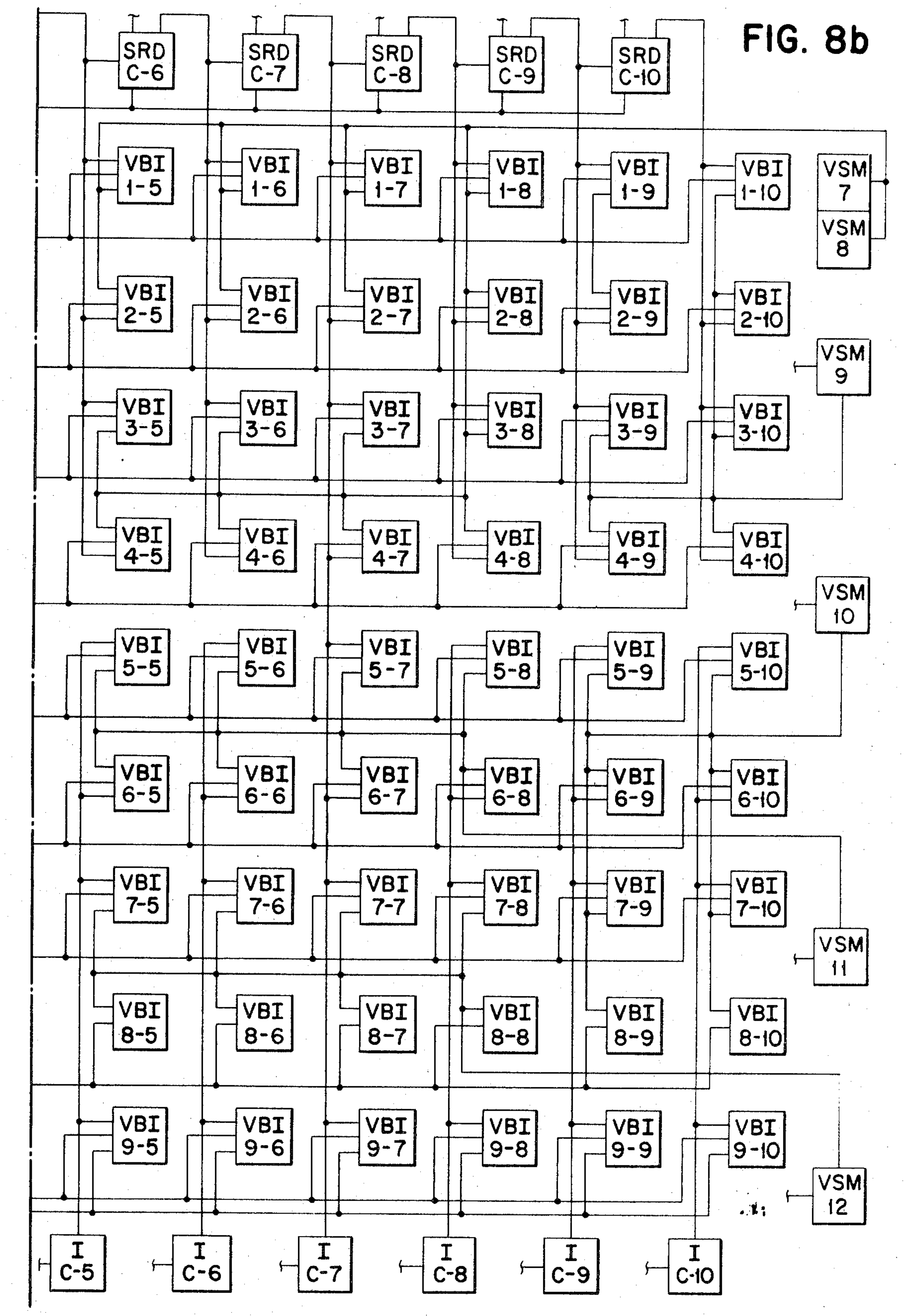

The function of the Video Bit Insertion Matrix, illustrated in FIGS. 8*a* and 8*b*, when placed side by side with FIG. 8*a* to the left, is to address specific elements in the Storage Matrix in accordance with the current scan and scan sample signals and to set the elements if the video circuitry indicates a black condition.

The circuitry consists of 90 3-way AND circuits arranged in the same 9×10 matrix configuration as the Storage Matrix. The output of each of these circuits is connected to the set terminal of a similarly located element of the Video Pattern Storage Matrix.

The three inputs to each of the AND circuits are a column drive signal, a row drive signal, and a video signal, supplied on corresponding signal lines. The column and row driving elements of the matrix comprise elements of the type shown in FIGS. 5A and 5B connected as shift registers. They have been designated as SRD (shift register drive) in the diagram, with a suitable suffix indicating the column or row with which they are associated.

The row drive register is advanced in synchronism with the downward travel of the scan after the occurrence of the first black bit in any scan. The column drive register is advanced with the start of each scan after the occurrence of the video bit.

The 90 3-way AND circuits utilized in the Video Bit Insertion Matrix are designated as VBI (video bit insert) together with a suffix identifying them by row and column, for example, the AND circuit associated with the first column and first row is designated as VBI 1—1. Under the conditions previously described the first video bit which occurs for any character will result in an output from VBI 1—1. If, on the same scan, other video signals occur, they will result in actuating other VBI units in column 1 which will be properly related to one another in terms of the video sample times upon which they occurred. Similarly, the action of VBI 1–2. will be caused by the first video bit occurrence on the following scan of the character and other bits of the second scan will actuate VBI units of the second column, spaced relative to one another in accordance with the video sample times upon which they occurred.

Since the operation of each VBI circuit in FIGS. 8*a* and 8*b* causes the setting ON of similarly located memory element units in the Storage Matrix, the bits which are set in each column of the Storage Matrix at the conclusion of each scan will be vertically spaced properly within that column but will have no relationship to those of any other. These are the conditions which require the vertical registration operations which were described earlier.

Each of the SRD units is shown driving four AND circuit inputs. An inverter connected to the complementary output of the SRD unit is used to drive the remainder of the load. The third input to the VBI units is supplied by the VSM unit (video signal mix), which is shown in numbers which hold the driving requirements to the permitted number of input lines.

VIDEO PATTERN STORAGE MATRIX

Figure 9A:
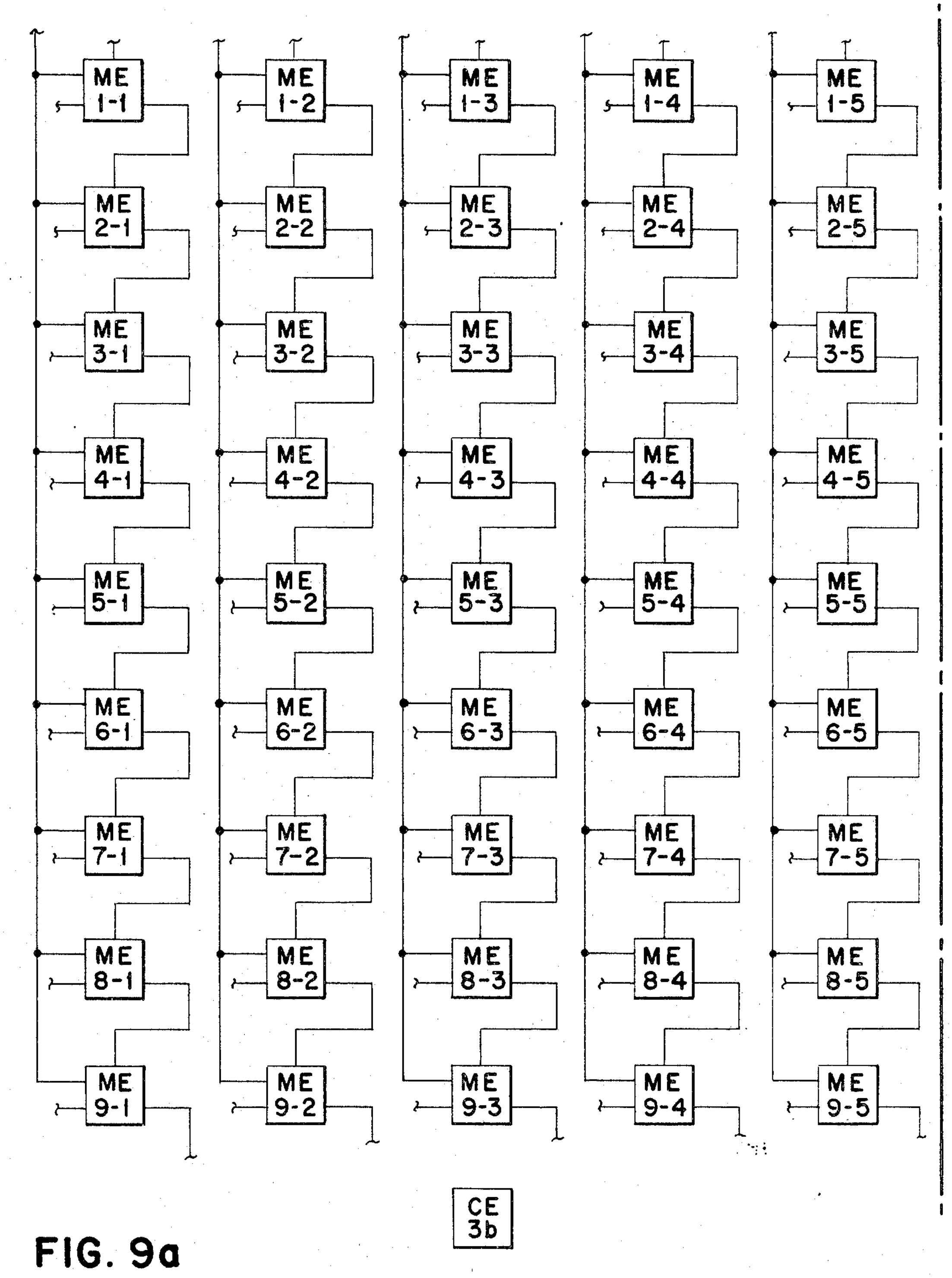
FIGS. 9*a* and 9*b* illustrate the video pattern storage matrix.
Figure 9B:
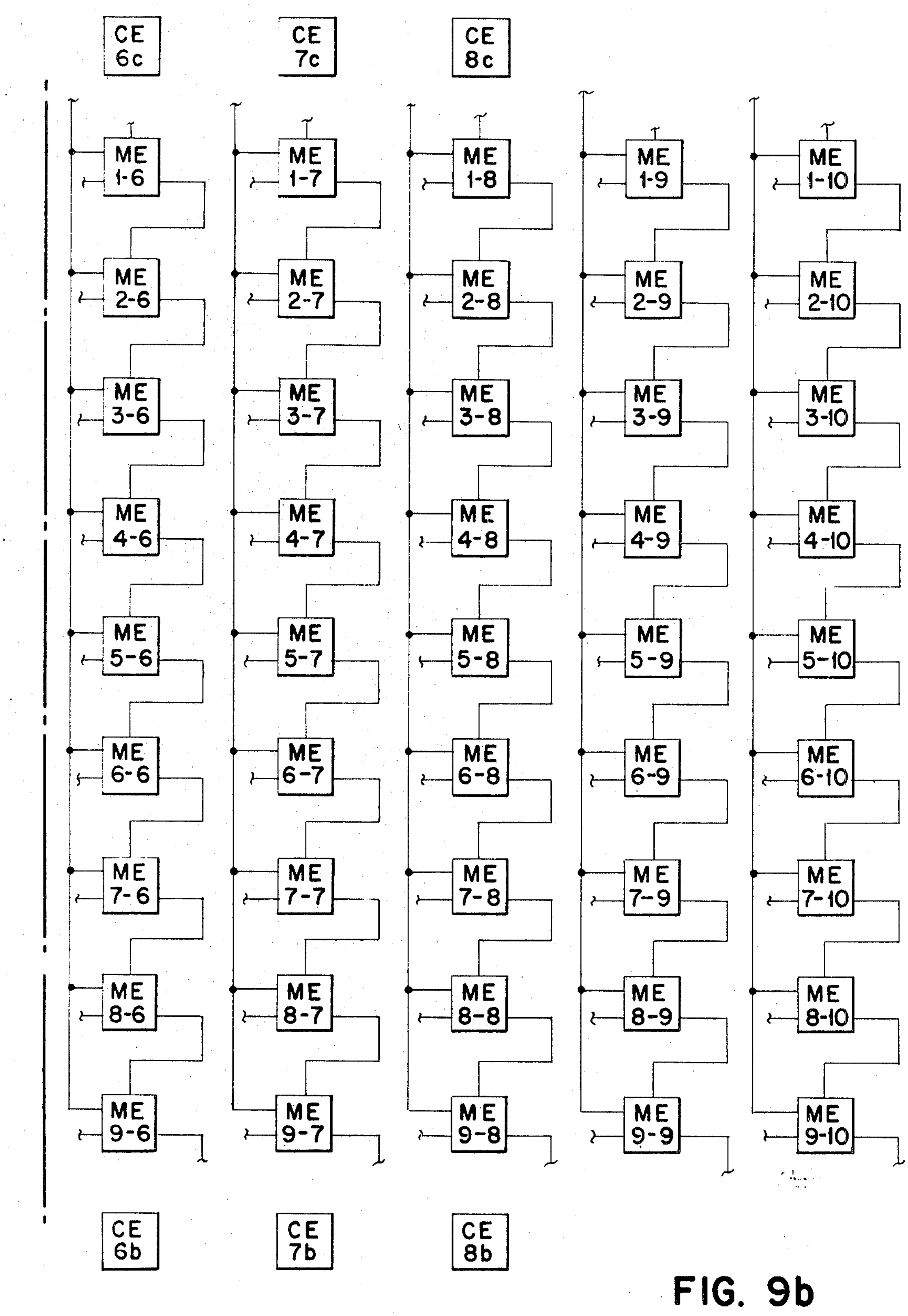

FIGS. 9*a* and 9*b* taken together in the order named, illustrate diagrammatically the Storage Matrix including 90 storage elements indicated by the rectangles bearing the reference characters ME and a suffix indicating the row and column such as 1—1 for the memory element in the first row on first column, etc. These memory elements are fed from the corresponding AND circuits in the Video Bit Matrix which was described in connection with FIGS. 8*a* and 8*b*, the output of each of the video bits AND circuits being supplied to the set terminal of the associated memory elements. The memory elements in each column of the Storage Matrix are connected into independent shift registers. The advance terminals of each element in the column are commonly connected so that bits in any column will be shifted downward with the application of positive going pulses to vertically extending advance line of the column. A broken connection at the lower left of each unit is a set terminal which is connected to the corresponding VBI circuit output.

The Column Element units CE-6*c*, CE-7*c*, and CE-8*c*, and Column Elements CE-3*b*, CE-6*b*, CE-7*b*, and CE-8*b* are shown above and below the matrix columns with which they are associated. The circuitry for these units and their function will be explained in detail subsequently as part of the circuitry associated with the second transform operation.

CIRCUITRY FOR NO. 1 TRANSFORM

The function of the circuitry for the No. 1 Transform is to shift and consolidate the video pattern standing in the 9×10 Video Pattern Storage Matrix into a 5×6 section centrally located in the same storage in accordance with predetermined rules.

To use the same storage positions for the transform patterns as those in which the bits of the input pattern may be stored, requires a sequential operation which has been described heretofore. The circuitry for the transform operation is operative in three sequential steps, each of which is very similar to the others but each of which is illustrated so as to indicate the required circuitry for its accomplishment. On each of the steps to be described, it will be noted that the circuitry involved is that of circuits relating to the Video Pattern Storage Matrix as previously described. Accordingly, it will be appreciated that in these instances, the memory elements involved may be similar in each of the various views involved in describing the sequential steps.

Figure 10:
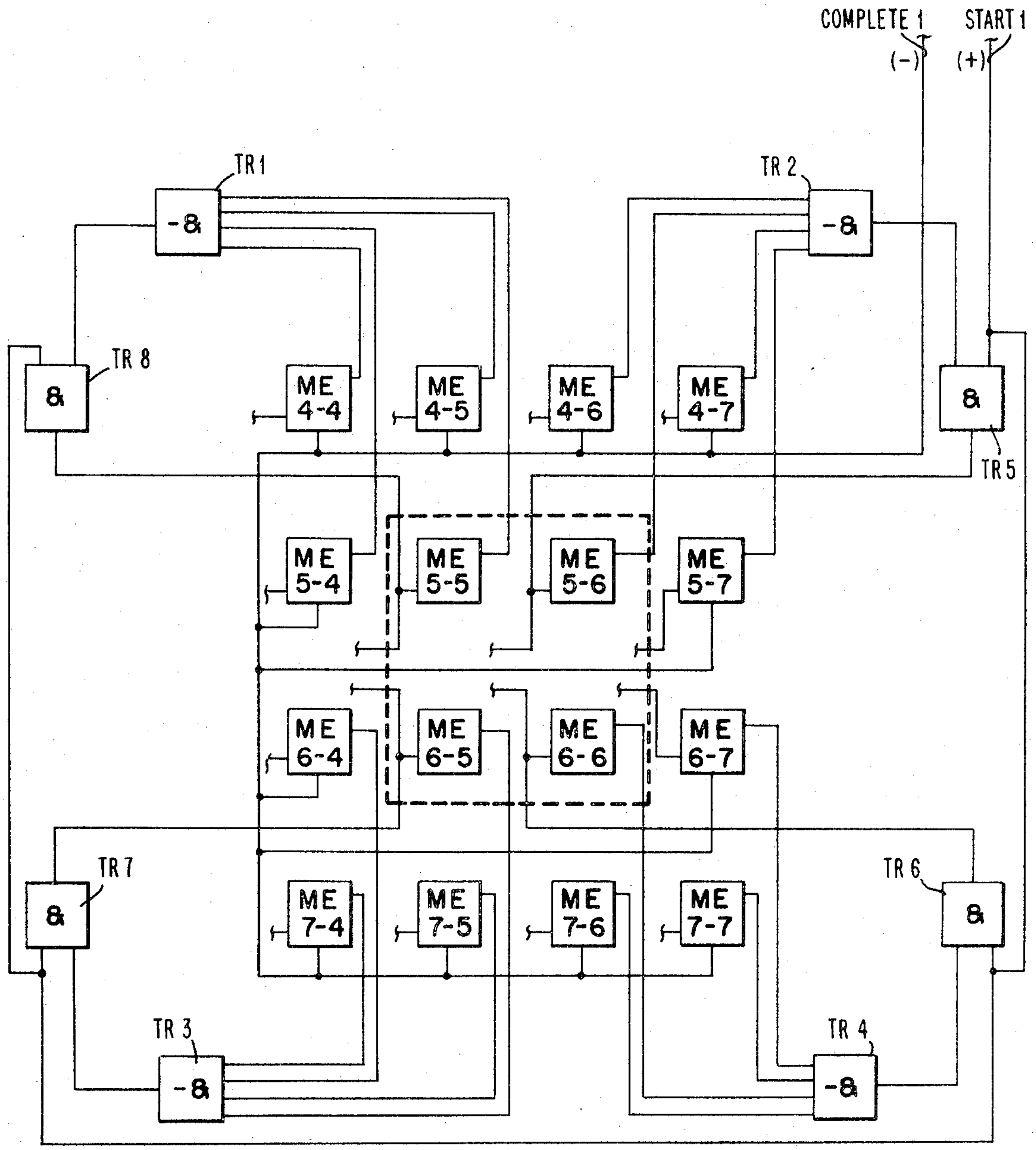
FIG. 10 is a fragmentary illustration of the storage matrix illustrating the elements involved in a first step of a data transformation.

The first step of the sequence involved in the first transformation includes the setting of four storage elements to their Transform 1 output positions. Referring to FIG. 10 of the drawings, the four positions involved are ME-5—5, 5–6, 6–5, and 6—6. These storage element positions are shown enclosed in the dotted line in the diagram. They are all positioned in accordance with the same rule, that is, if they are set or if any one of the three units adjacent to them outside the dotted lines are set, then they should be in the set position as part of the transform output.

A 4-way OR circuit, actually a negative AND circuit, is associated with each of the four elements to be positioned. In FIG. 10, the 4-way OR circuits are designated as TR1, TR2, TR3, and TR4. The complementary output of the unit to be positioned and the similar output for each of the three adjacent elements are the inputs to this circuit, which will have a plus level output, if any of the connected elements is in the set condition. The start of the transformation operation is timed by a positive pulse START 1 to each of the four AND circuits to which the output of the OR circuits is connected. In FIG. 10 these AND circuits are designated as TR5, TR6, TR7, and TR8. If any of the OR circuits are operative, the OR output together with the Start pulse supplied on the designated line will actuate the AND circuit, whose consequent ground level output will set the appropriate memory element. The transform step is completed by the application of the ground level pulse via the line designated as COMPLETE 1 to the reset terminal of the 12 ME units adjacent to the four which have been set. This action clears the surrounding units so that they may be set to their transform position by the second transform step.

Figure 11:
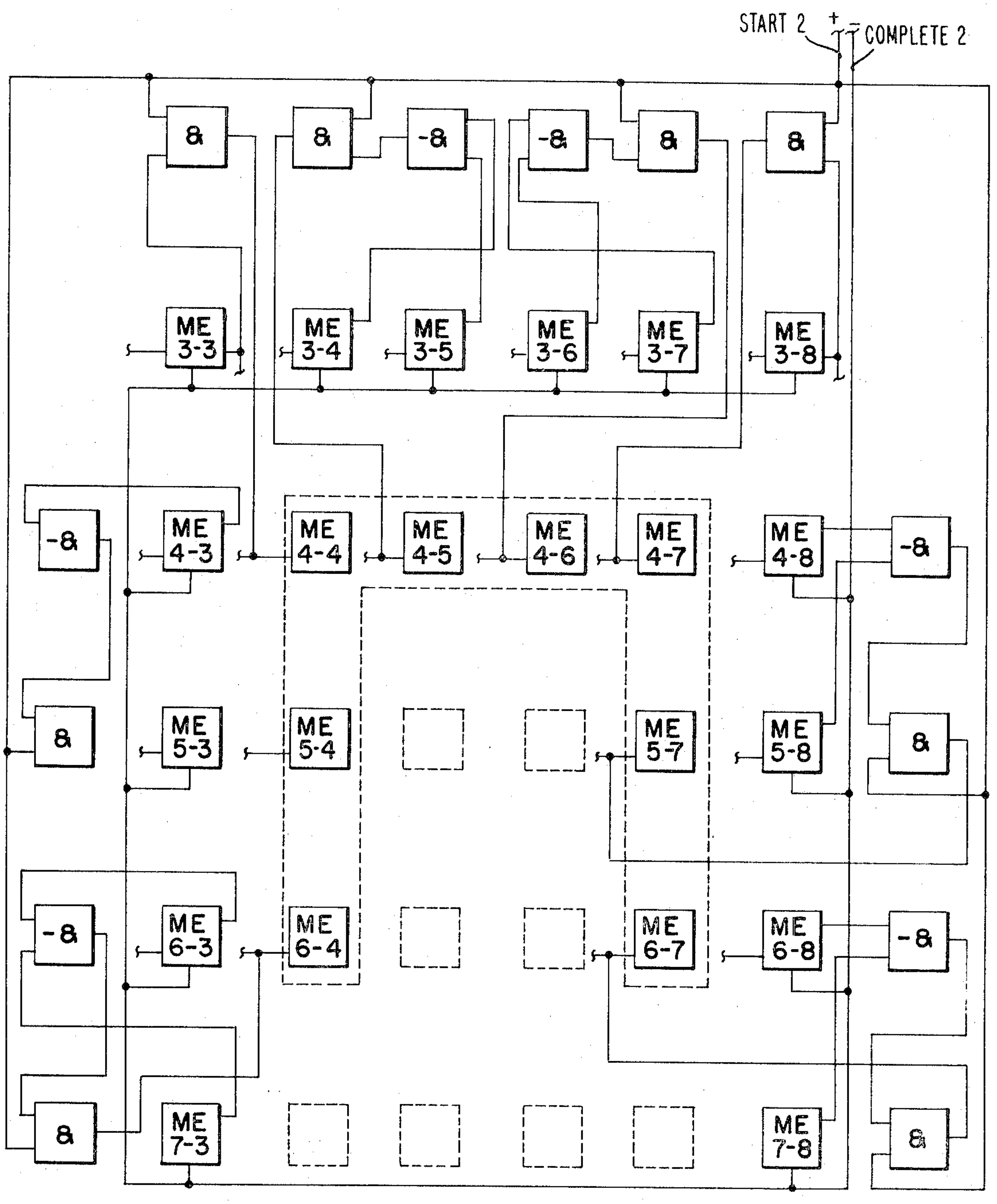
FIG. 11 is a fragmentary schematic diagram illustrating the second step in the transformation of data.

FIG. 11 illustrates the apparatus involved in the second step of the first transformation.

The eight elements which are to be set in their transformed position on this step are those included within the dotted lines on the diagram. An additional four units in the seventh row are clear and could be included in this transform but the transform operation is somewhat more symmetrical if their setting is delayed until the third step. The memory element units to be set in this step are all dependent for their final positions upon two other elements, as will be apparent from the configurations as shown in FIGS. 2A and 2B. Accordingly, a two-branch negative AND circuit is provided for each of the elements to be set in this step, and associated with each negative AND circuit is a two-way positive AND circuit as in the first step. The second step is timed by a positive pulse commonly connected to each of the AND circuits designated as START 2 and is terminated by a ground level pulse designated COMPLETE 2, which resets the 14 adjacent memory element units whose initial settings are no longer required. These associations are manifest from the illustration of FIG. 11, and it is deemed unnecessary to describe the detailed wiring connections.

Figure 12:
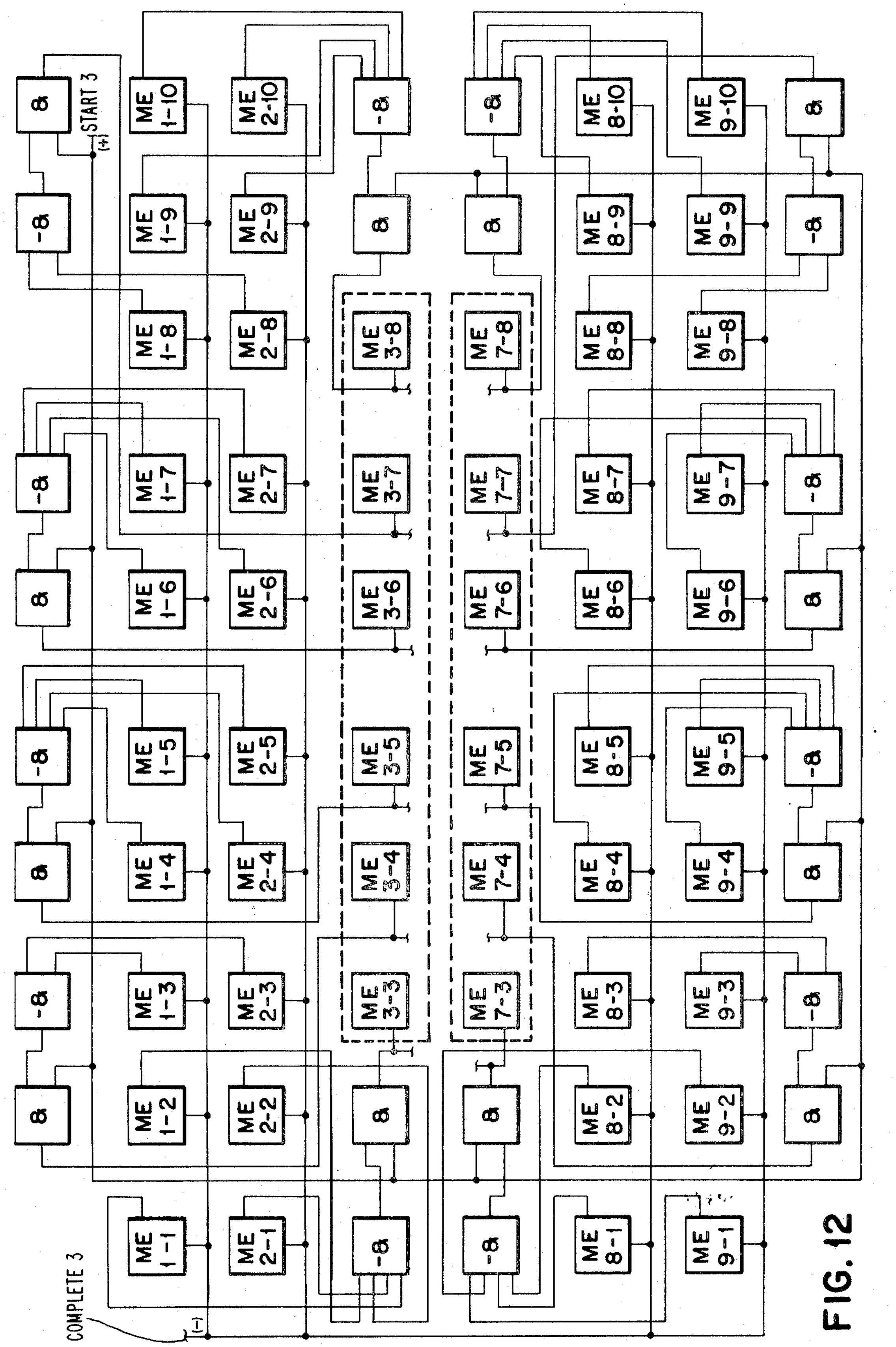
FIG. 12 is a fragmentary view of another portion of the matrix involved during the third step of a data transformation.
Figure 13:
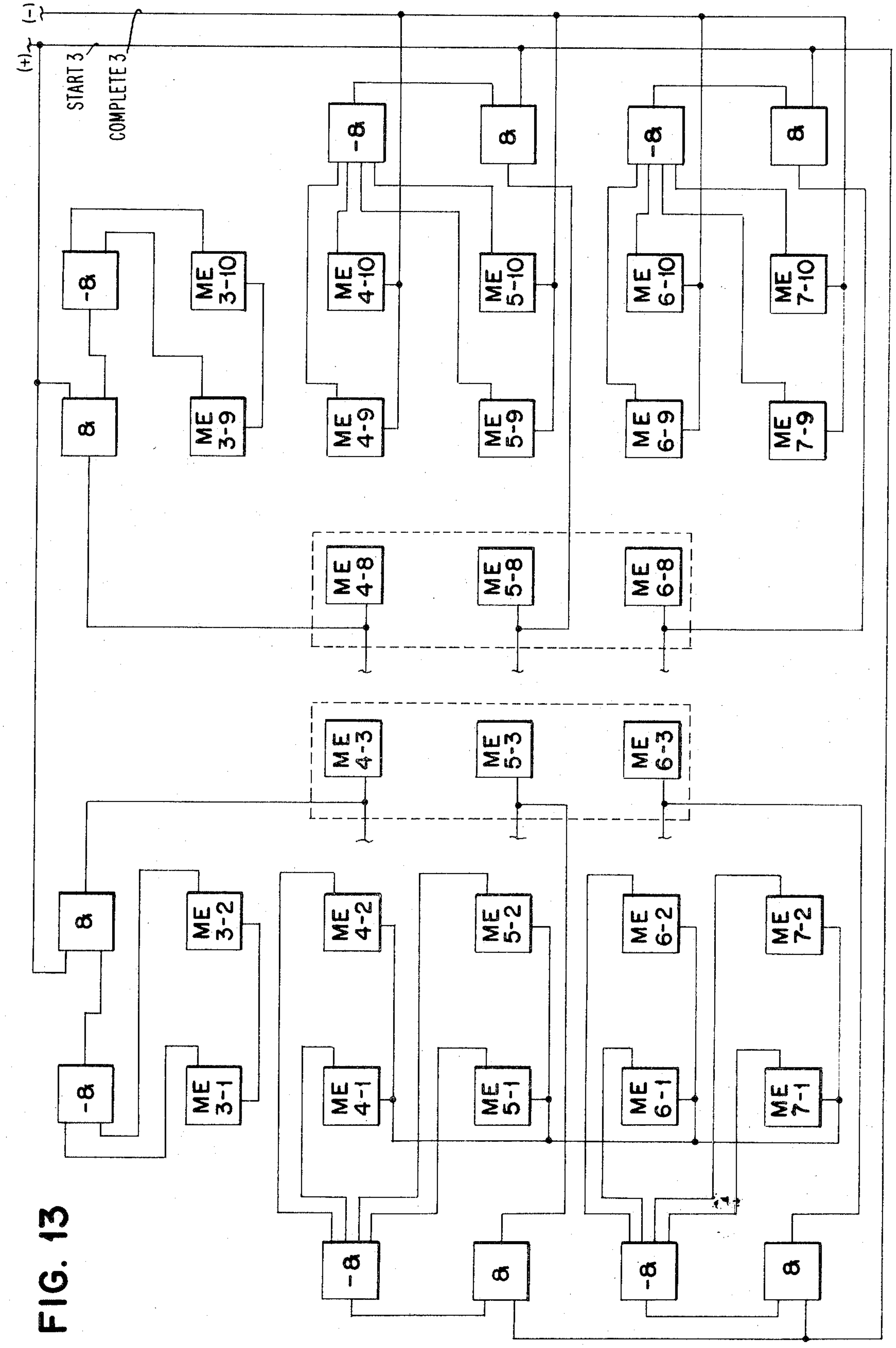
FIG. 13 is a fragmentary schematic diagram of the operating circuitry associated with the second transform arrangement which may be realized in the invention.

FIGS. 12 and 13 illustrate the portions of the apparatus involved with the third step of the first transform. At the conclusion of step 2 there remain 18 of the storage units which must be set to their transform positions. These are all set in the third step of the first transform.

The six memory element units in each of rows 3 and 7 and the associated circuitry connected therewith are shown in FIG. 12, and the circuitry for the remaining six elements are shown in FIG. 13. The mode of operation for the third step is identical to that for the first two. The conditions for the transform positions of the elements may be noted in the diagram of FIG. 2A, and require both 2- and 4-way negative AND circuits. The START 3 and COMPLETE 3 lines shown in FIGS. 12 and 13 are commonly connected so that all 18 of the units shown in these two drawings as being set at this step are simultaneously set. At the termination of this third step of the transform, the pattern is complete in the 5×6 central section of the Storage Matrix and all of the other units in the matrix have been reset.

CIRCUITRY FOR TRANSFORM 2

The circuitry for Transform 2 includes that used for the operations previously described under the general description, namely, (a) circulation of column data, (b) consolidation of column data, (c) deletion of column data, and (d) transfer column data.

It should be noted that the column data subjected to these operations is the output pattern of Transform 1 and that the columns operated upon are, therefore, columns 3–8 and row positions 3–7 of these columns.

The provision of nine advance pulses is a basic requirement for all these operations and the row drive of the Video Bit Insertion Matrix has a similar need. The circuitry to be described is used to meet both of these requirements.

Figure 14:
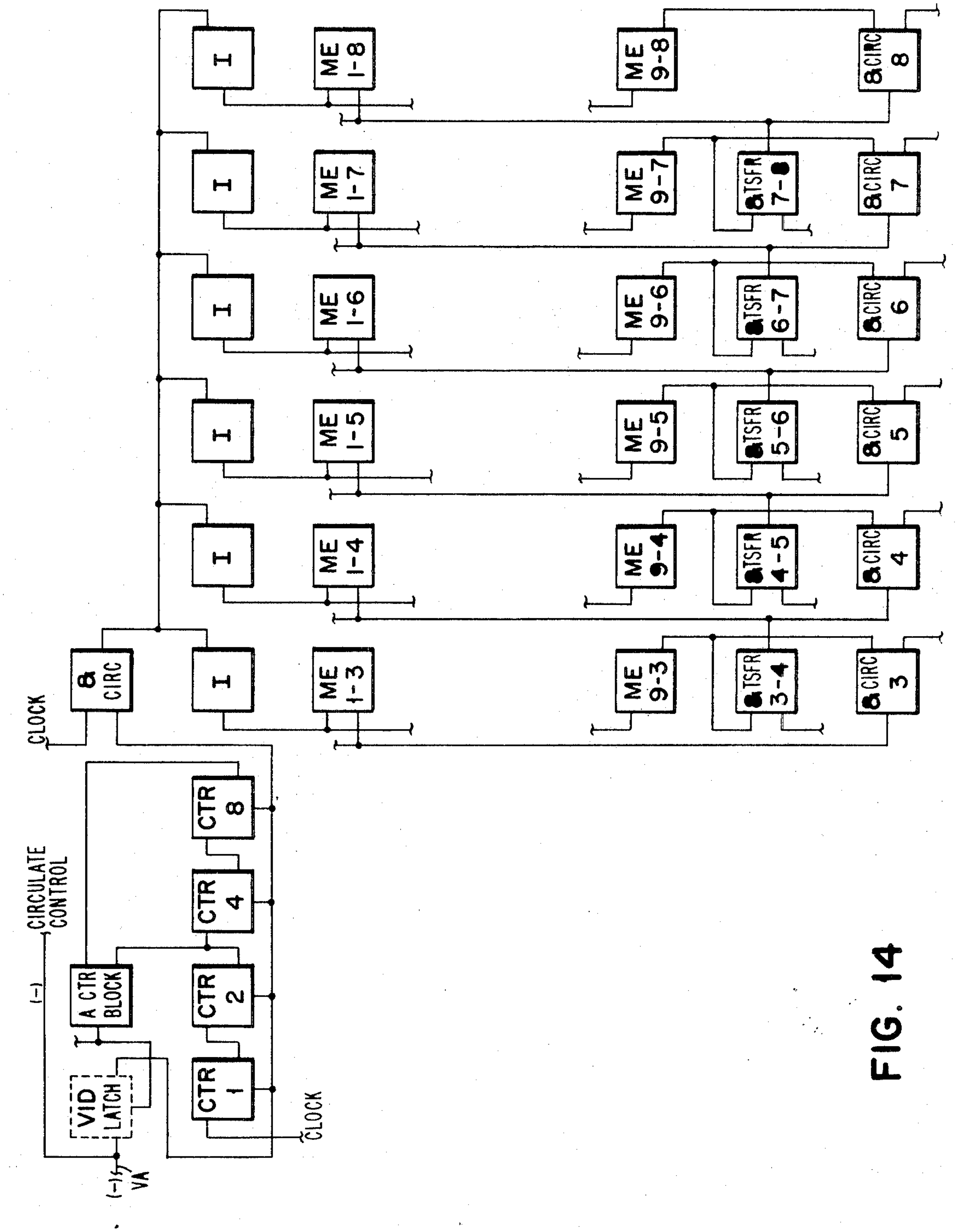
FIG. 14 is a schematic view of additional circuitry involved in the second data transformation illustrating portions of the circuitry involved in the first stage of a second transformation.

In FIG. 14, the four units in the upper left section of the drawing designated as CTR 1, CTR 2, CTR 4, and CTR 8 are connected to form a binary counter. This counter is normally held in a reset condition by the ground level output of the Video Latch in its OFF condition. The setting of the Video Latch by a video signal or by a circulate control pulse on the line indicated will release the counter for operation. Clock pulses are the input to the first counter stage and the counter is advanced in synchronism with the clock pulses until the tenth pulse causes actuation of the counter block. AND circuit designated in the drawing as a CTR BLOCK. The negative output of this unit resets the Video Latch to the OFF position which results in a reapplication of the reset voltage to the counter stages by the common reset line shown. The AND circuit designated as & CIRC is in condition for operation during the counter operation by the Video Latch output and the clock pulses supplied to it are inverted and supplied to the Column Drive inverters during the period of counter operation. An inverter unit is provided for each of the six columns of the matrix which is involved in Transform 2 operations and these inverter units are shown at the top of each of these columns. The function of these inverters is to restore the inverted clock pulses to proper polarity for connection to the Advance terminals of the storage elements in the matrix.

The circulation, consolidation, deletion, and transfer of column data is accomplished by conditioning various combinations of the pairs of AND circuits shown below each of columns 3–7 in the diagram. The exception to this arrangement is for column 8 in which only one AND circuit is employed.

The AND circuits in the upper row are designated by & TSFR, for transfer, and those of the lower row are designated by & CIRC, for circulate, as an indication of their functions. The output terminals of the storage units in the bottom row of the Storage Matrix are respectively connected to one of the input terminals for each type of AND circuit associated with the columns. The second input terminal to the AND circuits is a command voltage so that they may be selectively operated. The command circuitry will be described subsequently.

The output terminals of all of the & TSFR circuits are connected to the set terminals of the topmost unit in the next column to the right. A conditioning command voltage at the input to the & TSFR circuit associated with the leftmost of any two columns of the 3–8 group, and the application of nine advanced pulses to both columns will transfer the leftmost column of data to the rightmost column. Column 8 is not provided with a & TSFR circuit, since transfer beyond column 8 is not required.

The output terminals of all of the & CIRC circuits are connected to the set terminals of the storage element in the topmost position in the same column as that with which they are associated. A conditioning command voltage applied to any of these units, plus nine advance pulses, will circulate the data of any column back into its prior position.

If neither of the AND circuits associated with the column is operative, the application of nine advance pulses will delete all bits from that column since there is no return circuit from the last row storage element to any first row storage element. It should be noted that the advance pulses are applied to all columns simultaneously and that one of the two AND circuits associated with the column must be actuated if the data in the column is to be a part of the output of the second transform.

The circuitry described for the second transform operation will permit the simultaneous transfer of all columns one position to the right for each group of nine advance pulses. The lateral translation of all that will be remaining after second transform operations into columns 6, 7, and 8, can be accomplished by this means. The translation will be under control of Column Elements 6*w*, 7*w*, and 8*w*, as will be described under the control section for the second transform, which follows.

Figure 15:
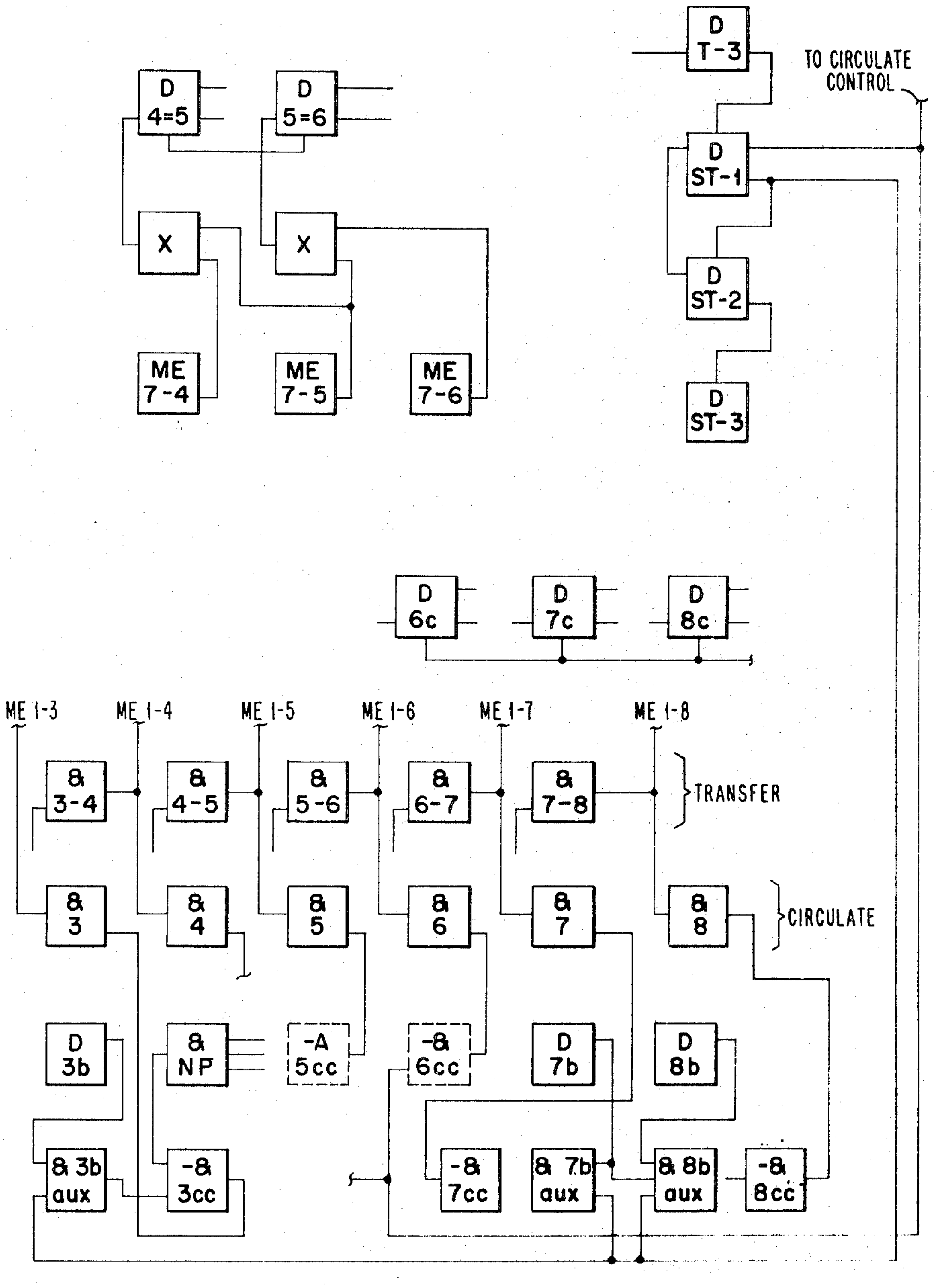
FIG. 15 is a diagrammatic view of a portion of the circuitry involved with the first stage of a second transformation of data.
Figure 16A:
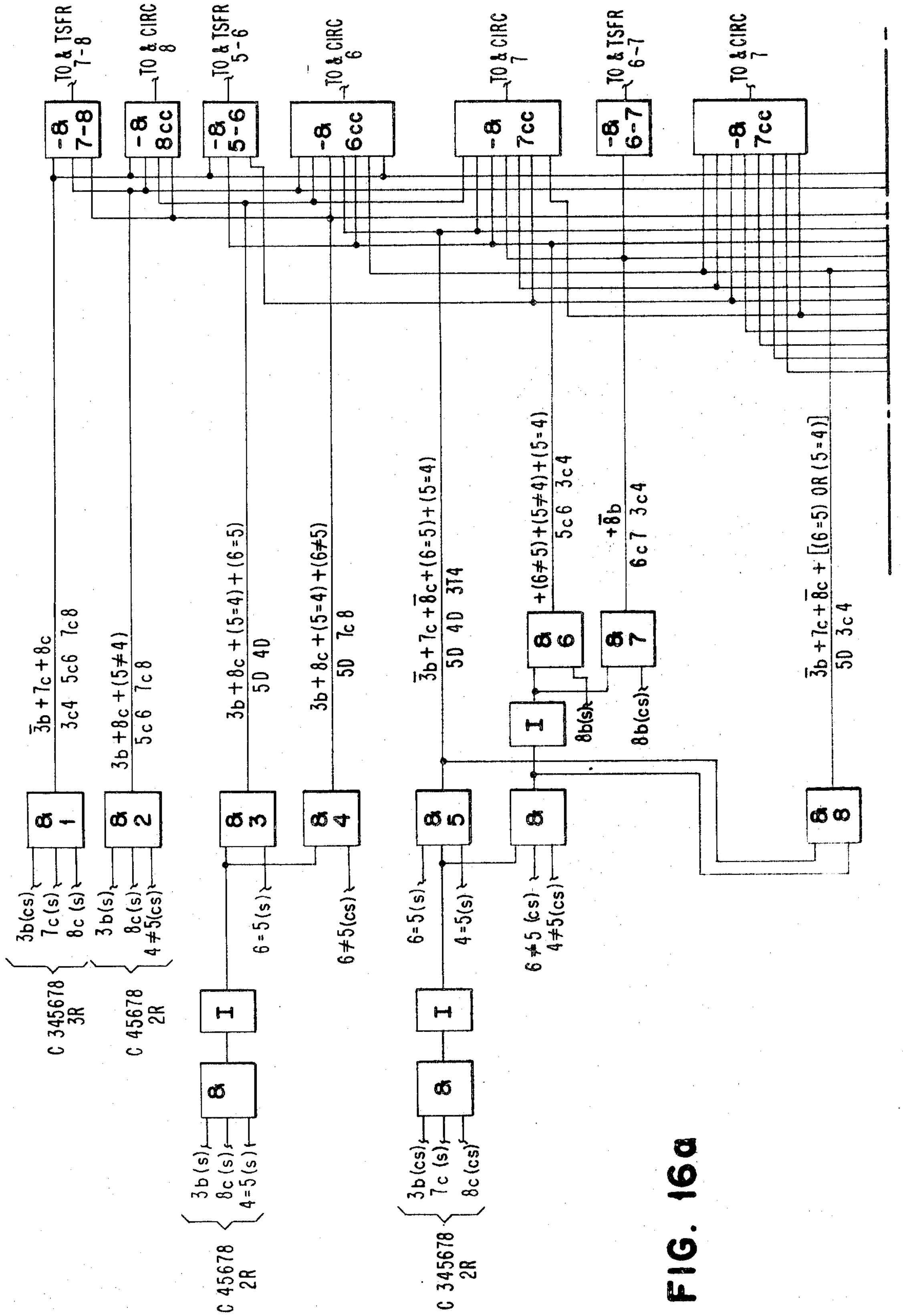
FIGS. 16*a* and 16*b* are fragmentary diagrams showing a portion of the apparatus involved with the second stage of a second transformation of data.
Figure 16B:
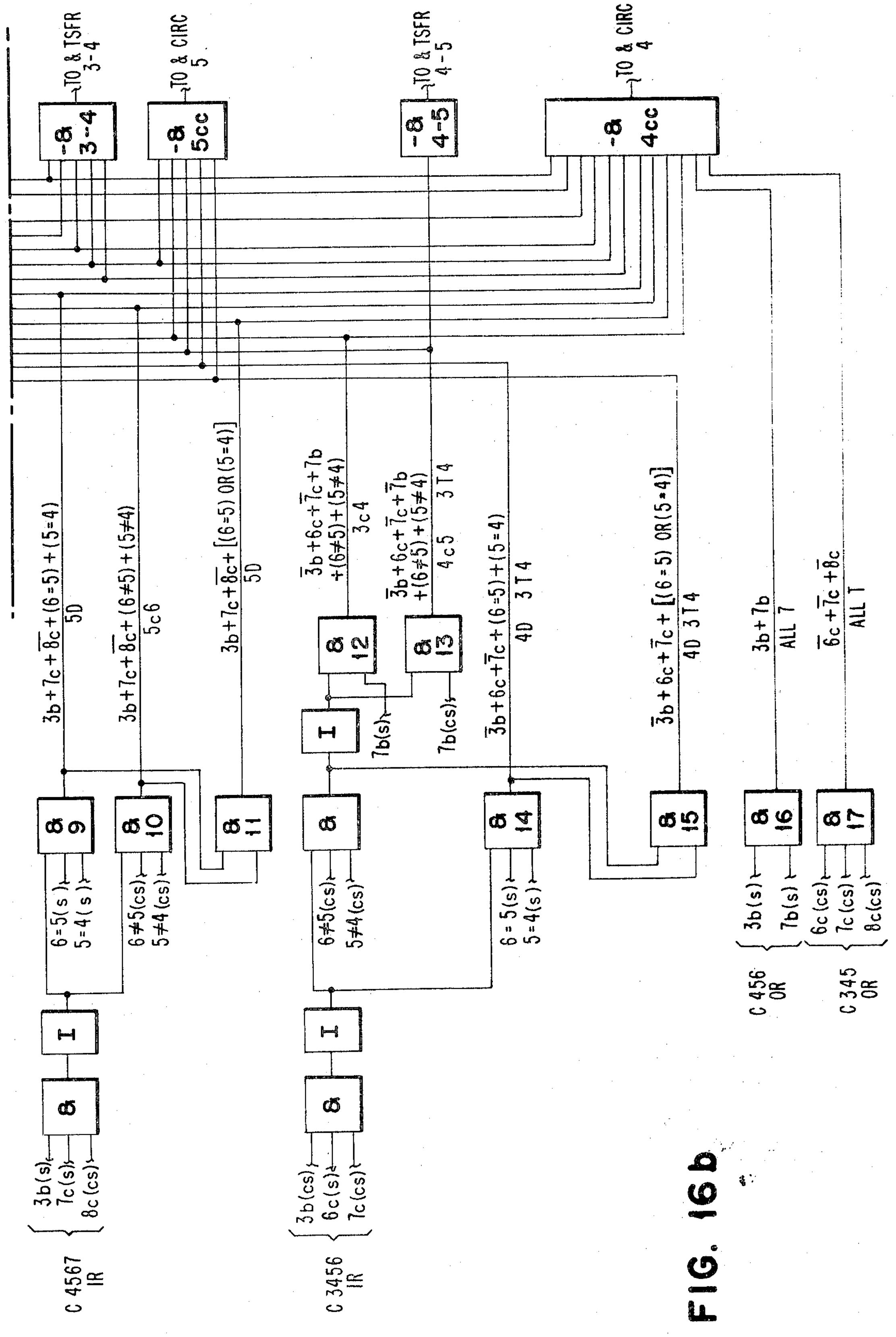
Figure 17:
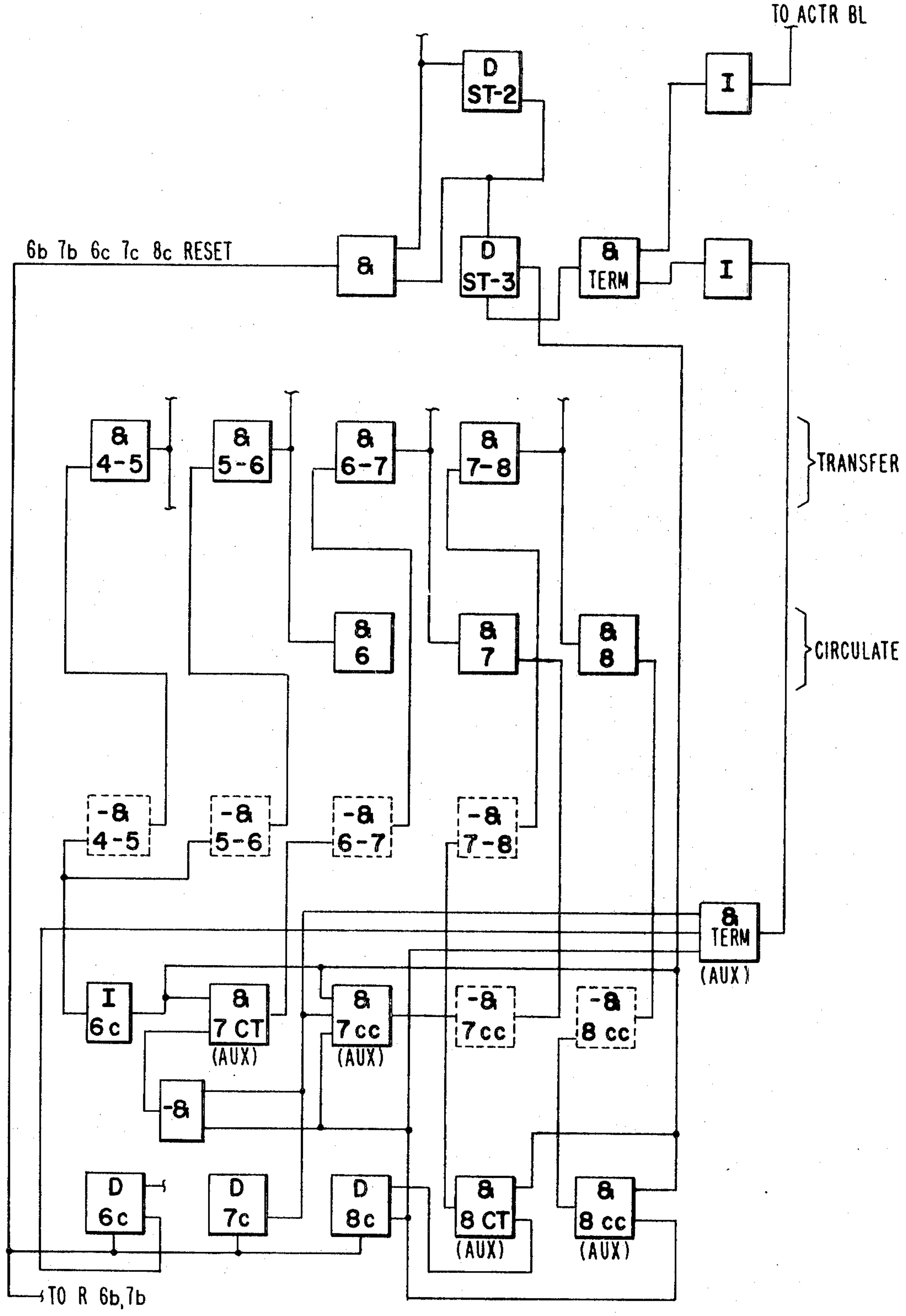
FIG. 17 is a fragmentary view showing a portion of the circuitry included in the third stage of a second transformation of data.

The controls involved for the second transform are shown in three separate diagrams, FIGS. 15, 16, and 17, which respectively illustrate each of the three sequential stages required by the second transform operation.

FIG. 15 shows the circuitry involved for the basic control of the second transform and specifically the circuitries for completing the first stage of the second transform operation. Three of the so-called D units or bistable units are connected as a shift register having stages designated as ST-1, ST-2, and ST-3. These units control the progression through the three stages and supply an indication upon completion of the Transform 2 operation.

Two comparison circuits are provided between the seventh row matrix storage elements in columns 4, 5, and 6. These units, indicated in the upper left portion of FIG. 15, are designated as D 4 = 5 and D 5 = 6. Their output terminals provide voltages indicative of duplicate and nonduplicate data conditions in columns 4 and 5, and 5 and 6 of the input pattern.

The *b* Column Elements 3*b*, 6*b*, 7*b*, and 8*b*, which are set by an all-black condition in their respective patterns, are also employed in the control for the second transform. The *c* Column Elements 6*c*, 7*c*, and 8*c*, which are set by any black bit in their respective columns, also enter into this operation. The *c* units are substituted for the *w* units previously described. They have the same function, which is to determine the input pattern width, but are better adapted for use in the circuitry. The five & TSFR circuits 3–4 through 7-8 and the five & CIRC circuits 4 through 8 are operational circuits previously shown and described in connection with the Transform 1 circuitry.

Stage 1 operations consist of the deletion of columns containing all-black bits from the input pattern in accordance with the settings of the *b* Column Elements, and the bit-by-bit comparison of columns 4 with 5, and 5 with 6, so that the Comparison units D 4 = 5 and D 5 = 6 may be set as a preparatory measure for Stage 2. Stage 1 operation is initiated by the ON condition of the first stage of the Shift Register unit ST-1. The voltage level at the CO terminal enables the shift pulse circuits so that nine shift pulses are supplied to each column of the input pattern.

The deletion of the column of data is accomplished during this pattern shift by holding the corresponding & CIRC unit in the nonoperative condition, that is, by keeping the input terminal at a suitable level. A column is retained or circulated by the application of a positive level such as +6 volts to the corresponding & CIRC unit terminal.

The desired deletion operations are:

1. Delete column 3, if 3*b* is set, unless the pattern has three columns only.
2. Delete columns 7 and 8, if 7*b* is set.
3. Delete column 8, if 8*b* is set.

In order that the *b* elements may cause the desired deletions and thereafter be noninterfering with later operations, each of these units is supplied with an auxiliary AND circuit. These are shown directly below each *b* unit at the bottom of FIG. 15. One terminal of each of these auxiliary units is supplied by the ON terminal ST-1, the other by the CO terminal of their respective *b* units. The auxiliary units are operative under the conditions that Stage 1 is in progress and their respective *b* units are in the non-set condition.

An OR circuit, equivalent to a −& unit, is also associated with each of the & CIRC units so that the controls of the circulation of column data may be multisourced. These units are designated by the suffix *cc*, standing for circulate control, and they are shown dotted for all columns except three, since the units appear on the Stage 2 diagram which follows. Unit 3*cc* is required solely for Stage 1 and was shown in solid lines. The *cc* units, when operative, supply a positive voltage level such as +6 volts to the input of the & CIRC units.

The **3*b* unit in the nonset condition and ST-1 in the set condition will cause & 3*b*** aux to have a zero level output voltage. This voltage at one terminal of −& 3*cc* causes the output voltage to rise to the positive level and thus activate 3 & CIRC so that the data in column 3 is retained. Similarly, a three-column pattern results in the activation of & NP (for narrow pattern) because of the nonset conditions of 6*c*, 7*c*, and 8*c*, a zero level input into the −& 3*c* unit and the circulation of column 3 data, regardless of the element **3*b***.

The CO terminal of **7*b*** is connected to both 7*b* aux and 8*b* aux units. If **7*b* is in the set condition, both 7*b* aux and 8*b*** aux are inoperative. The resultant nonoperation of the *cc* units causes a deletion of both columns 7 and 8. If **7*b* is in the nonset condition and 8*b*** is set, the latter will cause the 8 aux unit only to be inoperative and column 8 only will be deleted.

FIGS. **16*a* and 16*b* taken together illustrate the control circuitry used for governing the Stage 2 of the second transform. This circuitry essentially constitutes a plurality of logic units for combining particular conditions to provide outputs indicative of the desired operation of the & CIRC and & TSFR circuits previously described. This circuitry functions to reduce to three the number of columns remaining in the input pattern after the deletions of Stage 1 have taken place. The circuitry shown in FIGS. 16*a* and 16*b*** makes the required reductions in accordance with the description in a single circulation cycle of the video data. The OR circuits (−&) shown in the column on the right-hand side of the drawing provide output pulses to the & TSFR and & CIRC units, which actually accomplish the required operations on the pattern columns in the Storage Matrix. The logic units shown on the left-hand side of the page determine the combination of control units to be activated for the particular pattern in the process of transformation. The inputs for this determination are the voltages at the terminals of the Basic Control units, that is, the *b* and *c* Column Elements and the Comparison units D 4 = 5, and D 5 = 6 earlier described. The final AND circuits shown on the left-hand side of FIG. **16*a*, FIG. 16*b*** carry numerical designations from 1 through 17. The output lines from each of these carry above the line a statement of the conditions under which the output will be at zero volts, while the actions to be initiated by the signal line are indicated below the line. In this designation the "+" designates an AND operation in the legends carried above the line. In the legends below each line the *c* denotes "-consolidates," D denotes "deletes," and T denotes "transfer."

The column content of the pattern handled by each row of the input logic circuits at the left-hand side is shown to the left and under it is the number of reductions required. As an example, the designation C34567 with 2R underneath, denotes that the pattern is in columns 3, 4, 5, 6, and 7 and that a reduction of two columns is required. The AND-circuits 5, 6, 7, and 8 are associated with this group, since the two-column reduction takes four different forms, 5D, 4D; 5*c*6, 3*c*4; 6*c*7, 3*c*4; and 5D, 3*c*4; in accordance with the prior presence of an all-black column in column 8 and the duplication of columns.

The first column of AND circuits is used to defined the number of columns in the pattern. In all cases, except the topmost two and the bottommost two, further conditioning requires additional AND circuitry and the output of the first AND circuits must also be inverted. The next array of AND circuits is needed to determine duplication of columns as indicated by Comparison unit D 4 = 5 and D 5 = 6. The third column of AND circuits is used to indicate the prior presence of all-black conditions in columns 7 and 8, which have been deleted by first stage operation.

As an example of circuit operation, assume that the input pattern at the conclusion of Stage 1 is located in five columns, namely, 3, 4, 5, 6, and 7. This pattern will cause the operation of the input AND circuit to the left of & 5, whose inputs defined a pattern in columns 3–7. The inputs are **3*b* nonset (column 3 has not been deleted), 7*c* set (data exists in column 7), and 8*c* nonset (all-white conditions in column 8). The output of this first AND unit is inverted and supplied as one input to & 5 and to the AND circuit directly below & 5. & 5** will be operative as the input pattern exists in 3–7 and the column 4 data is a duplicate of column 5 and column 5 a duplicate of column 6.

Under these conditions, the desired action is the deletion of columns 4 and 5 leaving columns 3, 6, and 7. The output of & 5 is therefore connected to 6*cc* and 7*cc*, so that these columns will be retained, and the output is also connected to −& 3–4, the latter connection operating to reduce the number of transfers required during Stage 3. The resultant pattern will consist of three columns of data in positions 4, 5, and 6.

If there is no duplication in columns 4 and 5, or 5 and 6, the AND circuit directly below & 5 will be operative. In this case the required course of action is determined by whether or not column 8 had been all-black (and hence, deleted during Stage 1). The AND circuit output is therefore inverted and connected to & 6 and & 7, which are respectively operative in accordance with **8*b* set and 8*b* nonset. If 8*b*** had been set, that is column 8 was previously all-black, it is required that column 3 be consolidated with column 4, and column 5 be consolidated with column 6. This operation requires the simultaneous circulation of columns 4 and 6, the transfer of columns 3 and 4, and retention with circulation of column 7. Accordingly, the output of & 6 is connected to unit 4*cc*, 6*cc*, 7*cc*, 3T4, and 5T6.

Under the conditions described, the resulting three-column output pattern will stand in columns 4, 6, and 7.

If column 8 had not previously been all-black, the AND circuit & 7 rather than & 6 would be operative. In such case, it is required that column 3 be consolidated with column 4 and column 6 consolidated with column 7. & 7 output is therefore connected to 4*cc* and 7*cc* for the purpose of consolidation and to 5*cc* for retention. It is also connected to 3T4 and 6T7 for transfer. The three-column output pattern will then stand in columns 4, 5, and 7.

If, as a final condition, either column 4 duplicates column 5, or column 5 duplicates column 6, it is desired to delete column 5 and consolidate column 3 with column 4. Under these circumstances circuit & 8 is operative since its two outputs will be positive only if both & 5 and the AND circuit with the comparators 4=5 and 5=6 are inoperative. The output of & 8 causes a deletion of column 5 and the consolidation of column 3 with column 4 by the connection to units 4*cc*, 6*cc*, 7*cc*, and 3T4. The three-column output pattern is left in columns 4, 6, and 7.

The operation of the other groups of control circuitry is similar to that described above. The input lines in the diagram have been labeled CS and S, in which CS is the positive voltage condition for the nonset condition of a bistable unit and S is the positive voltage condition for the set condition of the bistable unit.

The circuitry for controlling the third stage of the second transform operation is shown in FIG. 17. This circuitry has a single function, namely, the transfer of the three-column patterns resulting from the second stage into column positions 6, 7, and 8 of the Storage Matrix. The Stage 2 operations have not left data in column 3 in any case, and in one case the three data columns are located in columns 6, 7, and 8. The maximum number of column transfers required by the third stage is therefore two, and the minimum is zero.

The transferal of column data from one column to the adjacent column to the right is accomplished by the actuation of the & TSFR circuits concurrent with a nine-bit shift of the data columns. The & CIRC 7 and 8 are operative to retain by circulation the data which is either in those columns at the start of the operation or is transferred into them by the first of the two transfer cycles which may be required. This operation is controlled by the output voltages of the Column Elements 6c, 7c, and 8c, which are indicative of data within their respective columns.

The first operation of the third stage of Transform 2 is the reset of Column Elements 6b, 7b, 6c, 7c, and 8c. The advance pulse for the counter units ST-1 and ST-2 is combined in an AND circuit with the 0 terminal of ST-2. The zero level output pulse on the line designated 6b7b6c7c8c, RESET is operative to reset the Column Elements. At the conclusion of this pulse the c elements will take a setting in accordance with the data conditions in their respective columns at the start of the third stage. The original settings of 3b and 8b have been retained, 6b and 7b will be set in the course of the third stage of operation, if the transfer data into these columns results in all-black condition. The counter unit ST-3 is set concurrently with the resetting of the Column Elements. The 0 terminal of ST-3 thereafter provides a positive enabling voltage to four auxiliary AND circuits and one inverter unit, which put Stage 3 operations under the control of the c elements.

The Inverter I 6-c will cause transfer of any data in column 5 to column 6, and from 4 to 5 on each cycle of the third stage. The AND circuit designated 7cT (AUX) will cause the transfer of column 6 data to column 7 on each third stage cycle during which either 7c or 8c are in a nonset condition. The AND-circuit 8cT (AUX) will transfer column 7 data to column 8, if 8c is in the nonset condition.

Unit 8cc (AUX) will retain column 8 data by circulation, if 8cc is set either at the start of the third stage or on the first cycle. Unit 7cc (AUX) will similarly circulate column 7 data during any Stage 3 cycle during which both 7c and 8c are set and indicative of the completion of data transfer into these columns.

These three operations are terminated by the reset of ST-3. The Binary Counter Block pulse is inverted and supplied to the AND circuit designated & TERM (AUX). When the conditioning of this unit is completed by the set conditions of 6c, 7c, and 8c, the negative output pulse will reset ST-3.

Figure 18A:
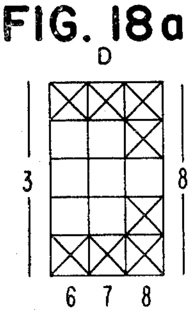
FIGS. 18*a* through 18*d* are diagrammatic illustrations of the spatial relation of information resulting from the transformation of characters, and representing the two-dimensional equivalent of the storage of exemplary characters after a second transformation, with respect to location of data for recognition analysis.
Figure 18B:
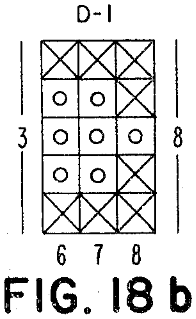

FIGS. 18a and 18b of the drawings are illustrative of recognition signatures obtained as a result of the second transform operation. FIG. 18a shows the Transform 2 output after transfer into Matrix Columns 6, 7, and 8. Column Elements 3b and 8b, if set during the second transform stage, are indicated by vertical lines adjacent to the data. In FIG. 18b, the X and O symbols in the signature indicate the bit positions which must be black or white, respectively, for recognition. Those positions with neither symbol are not utilized in the recognition process and may be either black or white.

Figure 18C:
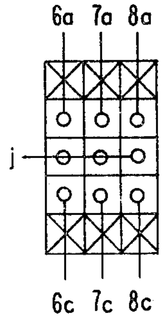
Figure 18D:
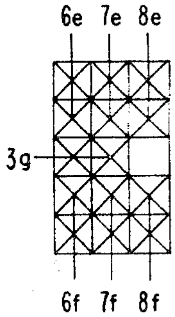

A number of combinations of information are found to exist which may be common to a plurality of characters, and these combinations are indicated by FIGS. 18c and 18d. For example, in FIG. 18c, j designates the combination which is provided by having no bit information stored in the middle row of the six rows of information. The combination 6a shows that a black bit is present in the upper left-hand element and the next element below it has no information present. In FIG. 18d, for example, the indication 3q indicates that in the third row black bits are present in columns 6 and 7.

From the information provided by black or white bits at the various matrix elements, plus the combinational information provided as indicated in FIGS. 18c and 18d, inputs can be provided to recognition logic circuits which then provide an output indicative of the character which has been scanned.

Figure 18E:
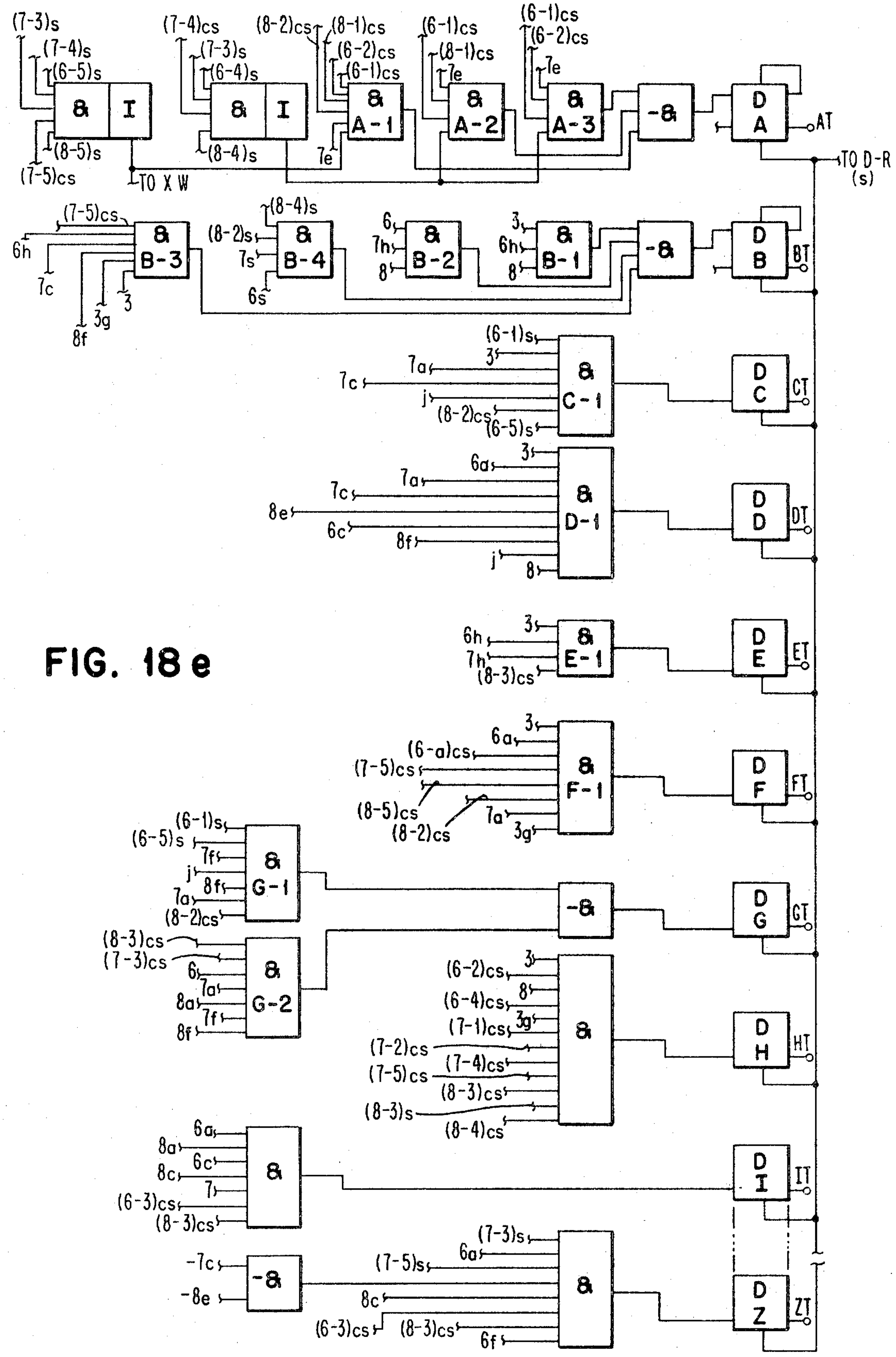
FIG. 18e is a fragmentary view showing a portion of the recognition circuitry which may be associated with the second transform embodiment of the invention as found in FIGS. 18a–18bq.

FIG. 18e of the drawings illustrates the type of circuitry used to provide final recognition based on the combinations of information stored in the matrix at the end of the second transform. The circuitry shown is that required for 10 of the alphabetic characters, including A through I, and the letter Z.

In general the circuitry includes a latch or bistable element which, when the proper inputs are provided, is set and provides an output at a terminal designated by the appropriate letter or numeral followed by the suffix T. For example, the terminal DT of latch D provides an output indicating that the letter D has been recognized by the system. The inputs to these storage elements comprise logic circuits which are arranged to utilize the stored information in whichever combinations are considered to represent the particular character. The output terminals of the final storage elements may be connected to any suitable utilization device either directly or by a suitable code translator as it is well known in the art.

The inputs to the &-circuit D-1 are those which are derived from character signatures, for example, such as the D-1 signature shown in FIG. 18b, with certain elements of the information being provided from the bit combination arrangements shown in FIGS. 18c and d. All of the various requirements must be met before the D latch is set on to provide an output at terminal DT. Considering the inputs to & D-1, the inputs designated as 3 and 8 are those which indicate that the columns 3 and 8 were black as shown by the lines on either side of the signature component layout in FIG. 18b. The input designated as 6a is that bit combination shown in FIG. 18c indicating that the top left-hand element has a black bit therein and the next lower element has no black. The input designated as 7a is from the center column in FIG. 18c indicating that the topmost element has a black bit therein and the next element down has a white bit. The input designated as 7c shows that the bottom element in the center column is black and the next higher element is white. The input designated as 8e indicates, as shown in FIG. 18d, that the two top elements in the right-hand column are both black. The input designated as 6c indicates, as shown in FIG. 18c, that in the left-hand column the bottom element is black and the next higher one is white. The input designated as 8f indicates that the bottom two elements in the right-hand column, as shown in FIG. 18d, are both black. The input designated as j indicates, as shown in FIG. 18c, that the center row has no black in it. The inputs, as described, all being satisfied, provide an output therefore when the conditions shown in the signature D-1, in FIG. 18d, are met. At this time the D Latch will be turned on to provide an output at the terminal DT.

More than one signature may be provided, such as shown by the logic circuitry in FIG. 18e, for the letter G. There will be two signature variations for this letter. Another example would be that of the letter A where the storage element DA is set by a −& circuit which functions as an OR circuit whose inputs are the three variations of the information signatures which represent the letter A. The components of these circuits, that is, the & circuits designated as A-1, & A-2, and & A-3, define a plurality of similar conditions which are deemed to represent the presence of a letter A in the Storage Matrix at the end of a transform operation. The inputs to these units have been reduced in number by the use of the combined & and inverter units shown at the left-hand of the circuit. It is not considered necessary to describe this or the remaining circuits shown in FIG. 18e in detail, having pointed out one exemplary situation, since this portion of the apparatus is of the variety that is well known to those skilled in the art of character recognition systems, and it will be recognized that different circuitry could also be employed depending upon the rules involved in reducing and transforming the video data.

Figure 19:
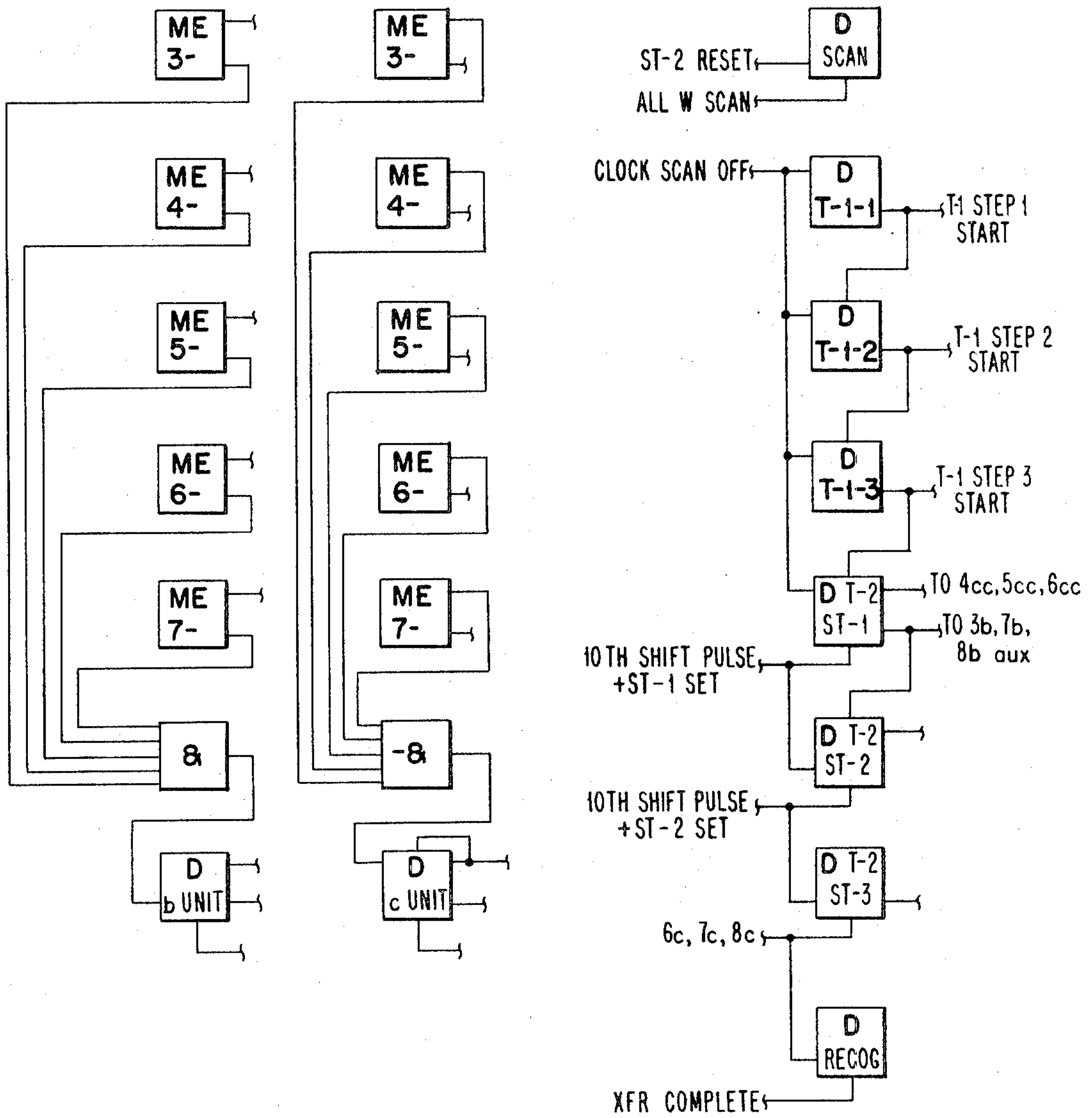
FIG. 19 is a fragmentary schematic view of certain miscellaneous control circuits associated with the system.

FIG. 19 illustrates some miscellaneous control circuits. The circuits on the left-hand side of the sheet illustrate those utilized for the setting of b and c Column Elements. As shown therein, the b unit is governed by the output of an AND circuit, the inputs of which are connected to each of the memory elements in the column which are to govern the Column Element. The b unit will operate only if all the necessary bit positions in the column are black. The c unit is governed by a negative AND, in other words, an OR circuit, since operation of this unit is required, if any bit position of the column is black.

The eight sequence control units are shown on the right-hand side of this drawing and the sequence of their operation is as follows: The D Scan unit is picked up as one of the Start operations. The set condition of the D Scan unit enables the scanner control circuits to operate so as to cause the scanning beam to progress across the character area. Data is collected, binarized, and stored until such time as the scanner fails to collect data because of having reached the right boundary of the character.

The all-white scan condition causes the reset of the D Scan unit and the following clock pulses progressively shift the three T-1 units which accomplish the first transform operation. With the completion of Transform 1, Transform 2 is started under the control of the unit designated ST-1.

Stages 1 and 2 of the second transform each require one circulation cycle and hence, their controlling units are set and reset by the tenth count of the binary counter timing the circulation operation. Stage 3 of the second transform is variable in length, and it is terminated by the reset of the controlling unit when columns 6, 7, and 8 contain data as a result of the Stage 3 transfer operations.

The recognition unit is set and held in that condition by the reset pulse to ST-3. It is reset when the accepting equipment signals that the character identified has been stored, by an appropriate signal designated "XFR COMPLETE."

The scan control has been set to permit the restart of the scan by the reset of ST-2. New video data may be stored up to column 3 prior to interference with the Transform 2 pattern.

Figure 20:
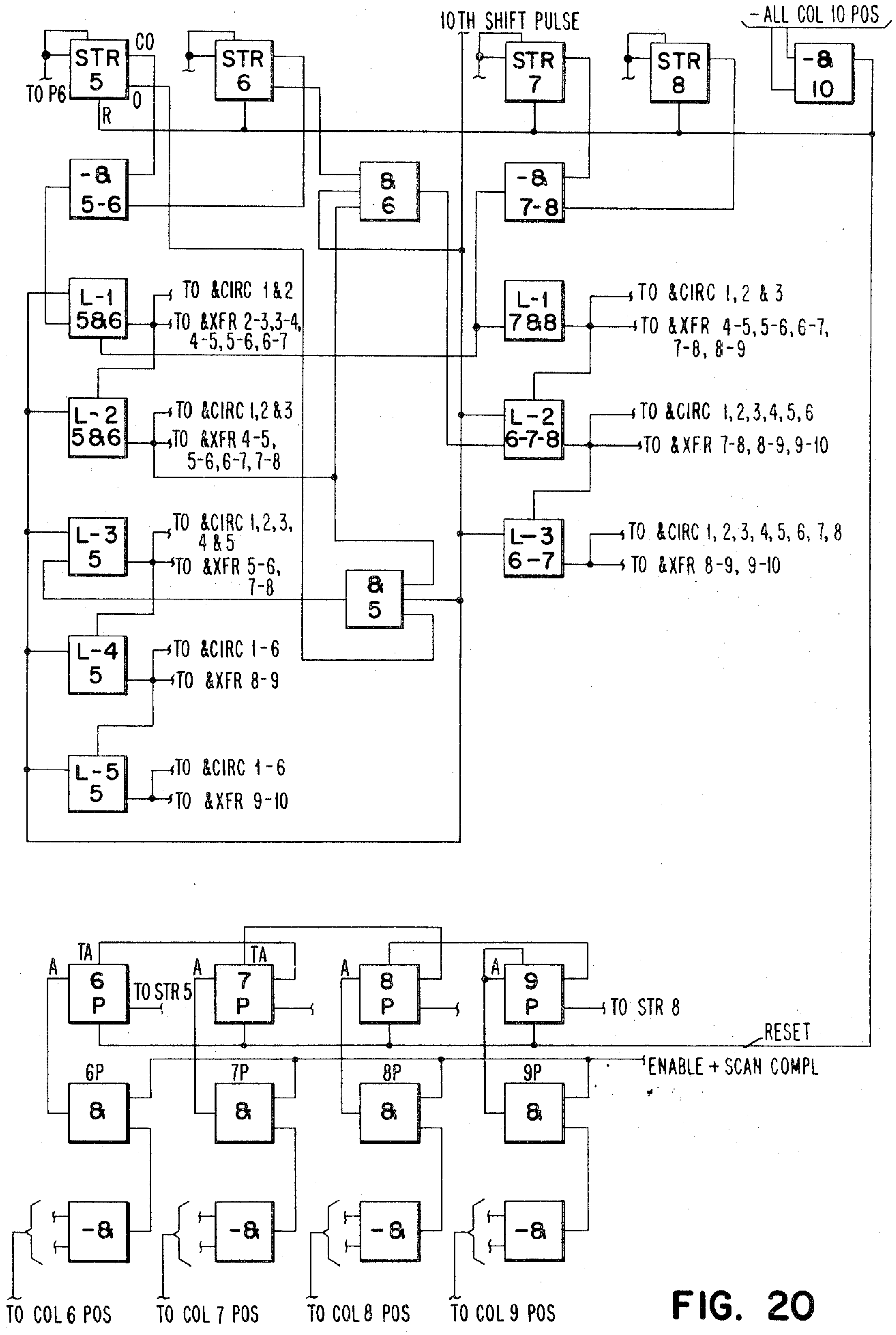
FIG. 20 is a schematic view of additional miscellaneous circuits.

FIG. 20 shows circuitry which may be utilized in a system of the type described above to normalize the width of video patterns prior to data transformation. In the system as described above, a transformation was applied to the binarized video patterns derived from a low-resolution scan. The output of this transform permitted the recognition of characters varying in both size and style within certain limits. The limits related to serif lengths and to narrow versions of characters whose recognition depended on fine internal detail.

Specifically, narrow versions of characters such as M, W, Y, and X were beyond the recognition capabilities of the system. The serifs on characters such as E, F, and S, and to a lesser degree, T, P, and R, were limited to a lesser length than those found in some type fonts. The arrangement shown in FIG. 20, and to be subsequently described, significantly increases the systems tolerance for narrow characters such as those noted above and for serifs of a length equal to the maximum found in any font utilized with the system.

The operation which produces this increased tolerance is essentially a redistribution of the columns of data so that they extend or are "stretched" across the full width of the Storage Matrix. This redistribution is accomplished prior to the application of the transform and the specific columns to be shifted are a function of both the transform to be applied and the original width of the video pattern.

Two significant advantages of the stretch operation are the increased capability for recognition of varied character styles and an economic advantage in that the greater uniformity of the output patterns permits the use of fewer components in the recognition circuitry.

Figure 21A:
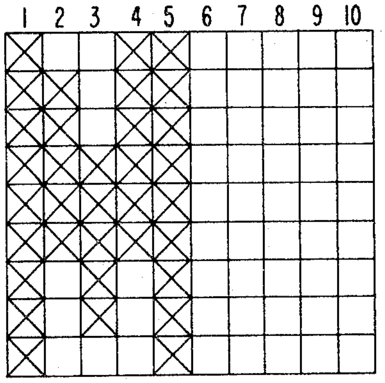
FIGS. 21a, 21b, 21c, and 21d illustrate the manner in which characters may be "stretched."
Figure 21B:
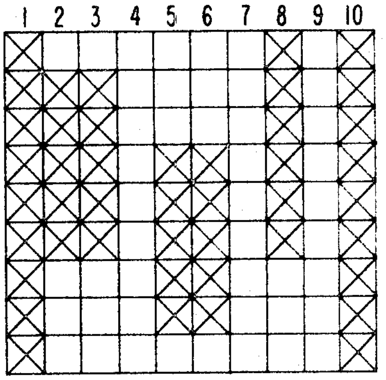
Figure 21C:
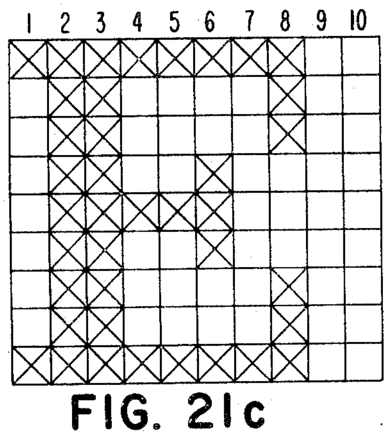
Figure 21D:
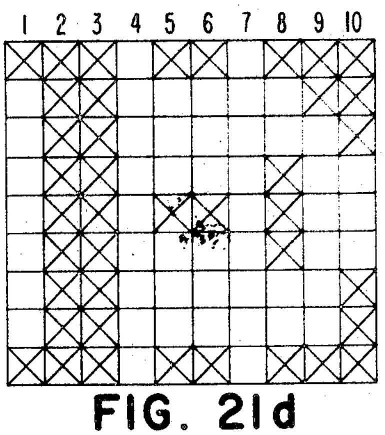

Examples of stretched video patterns are shown in FIGS. 21*a* – 21*d*, in which two video patterns are shown as they appear in the Storage Matrix both before and after stretch. FIG. 21*a* shows the video pattern for the letter M as derived from a very narrow style of that character. FIG. 21*b* illustrates the same pattern after the stretch operation. FIGS. 21*c* and 21*d* are the patterns for a heavily serified style of the letter E.

The video pattern stretch operation illustrated results from the application of a fixed routine for column data transfer which, as previously noted, is a function of the video pattern width and the specific form of the data transform which follows. The fixed routine for a specific transform, and which results in the illustrated patterns follows Column Transfer Operations

| | 8 Col. Pat. Circ. | 8 Col. Pat. Xfr. | 7 Col. Pat. Circ. | 7 Col. Pat. Xfr. | 6 Col. Pat. Circ. | 6 Col. Pat. Xfr. | 5 Col. Pat. Circ. | 5 Col. Pat. Xfr. |
|---|---|---|---|---|---|---|---|---|
| 1. | 1-3 | 4-5<br>5-6<br>6-7<br>7-8<br>8-9 | 1-3 | 4-5<br>5-6<br>6-7<br>7-8<br>8-9 | 1-2 | 2-3<br>3-4<br>4-5<br>5-6<br>6-7 | 1-2 | 2-3<br>3-4<br>4-5<br>5-6<br>6-7 |
| 2. | 1-6 | 7-8<br>8-9<br>9-10 | 1-6 | 7-8<br>8-9<br>9-10 | 1-3 | 4-5<br>5-6<br>6-7<br>7-8 | 1-3 | 4-5<br>5-6<br>6-7<br>7-8 |
| 3. | | | 1-8 | 8-9<br>9-10 | 1-6 | 7-8<br>8-9 | 1-5 | 5-6<br>7-8 |
| 4. | | | | | 1-8 | 8-9<br>9-10 | 1-6 | 8-9 |
| 5. | | | | | | | 1-6 | 9-10 |

The column headings in the above table refer to the column width of the video pattern in the Storage Matrix as it is registered from the scanner. The subheadings refer to the required circulation and transfer of column data which are to b e accomplished. For example, the notation "1–3" under the "Circ" subheading under the "8-Col. Pattern" heading signifies that columns 1, 2, and 3 are to be circulated. The "4–5" under the "Xfr" heading requires that the data in column 4 be transferred to column 5 of the Storage Matrix.

The operations listed under the column headings in the table are accomplished sequentially as indicated by the numerics 1 through 5 at the left edge of the table and the associated horizontal lines. The maximum number of sequential steps required is five, and is required for the 5-column video pattern only. On each sequential step all circulate and transfer operations listed for any particular pattern width accomplished simultaneously.

Video pattern width determination is accomplished by the use of a bistable element associated with each of columns 6, 7, 8, and 9 of the Storage Matrix. These elements are enabled at the conclusion of the character scan operation and are activated by a multibranch OR circuit, which will indicate the presence of any black bit in the respective columns of the Storage Matrix. The collective ON or OFF conditions of these bistable elements are used to indicate the width of the video pattern.

A five-column pattern, for example, results in the OFF condition of elements 6, 7, 8, and 9. A six-column pattern would be indicated by element 6 in the ON condition and all others OFF. Similarly, the 7 and 8 column width patterns are indicated, respectively, by 7 ON, 8 and 9 OFF, and by 8 ON and 9 OFF.

The lateral shift of video data from one column of the matrix to another has been previously described and includes two basic operations described as circulate and transfer. A prerequisite for both is the application of nine shift pulses to the storage elements in each column of the Storage Matrix. Since all Column Elements are connected as a shift register, the resultant nine-position shift of the bits in each column may be used to circulate, that is, to retain the video in its original position, or to transfer or shift the data from one column to another, or to combine the operations of circulate and transfer so that the data in one column may be retained in one column and duplicated in another.

The video pattern width determination described above is implemented by the P units 6–9 shown at the bottom of FIG. 20. The pickup of these units is timed by the associated & P6–9 circuits, and conditioned by their respective OR (–&) circuits which register the presence of any black bit in their respective columns of the Storage Matrix. A further condition is imposed for the pickup of units p6–P9 by the connection of each CO terminal to the TA input of the preceding unit. This connection suppresses the pickup of any unit unless those of higher order are all in the OFF condition.

The STR units 5–8 at the top of FIG. 20 are used to control the circulation and transferral of data as required by the fixed routine. They are connected to the P6–9 units and are picked in conformance with the conditions of the P6–9 units. The latch units shown below the STR units are those which activate the & CIRC and & TSFR units shown in other figures and whose function and operation have been previously described.

There are two columns of the operation control latches shown, five on the left side of FIG. 20, and three on the right. L-1 and L-2 in the left column are connected as a shift register. L-3, 4, and 5 of that column are similarly connected. The Le1, 2, and 3 units of the column on the right are also connected as a shift register. These registers are all advanced by the Tenth Shift Pulse line providing their initial stages have been set.

The initial stage of these registers, L-1, and L-3 in the left column of latches, and L-1 in the right column, are set by the –& and & circuits shown in FIG. 20. These circuits and the latch circuits have subscript designations which indicate the STR units and hence, the pattern widths with which they are associated. For example, the –& subscript 5–6 shown under STR5 of FIG. 20, controls the setting of L-1 subscript 5–6. This –& circuit is operative if either STR5 or STR6 is in the OFF condition. The consequent setting of L-1 subscript 5–6 causes the pickup of & CIRC controls 1 and 2 and the & TSFR controls 2–3, 3–4, etc., in conformance with the first sequential step required by the fixed rules for five- or 6- column video patterns as shown in the table.

Sequential step 2 will follow the first described above to continue the operations required by both five- and six-column video patterns. At the conclusion of this step, if STR5 only is in the OFF condition, the & subscript 5 opposite L-3(5) will set that latch because of the concurrent conditions of Tenth Shift Pulse, STR5 OFF, and L-2 (5–6) ON.

The pickup of L-3(5) and the consequent operation of L-4(5) and L-5(5) continue the sequential steps required by the stretch of a five-column width video pattern. If STR6 were ON, indicating a six-column video pattern, L-1 and L-2 (5–6) would be operative by virtue of STR5 in the OFF condition, but following L-2 (5–6) operations, the & 6 circuit would pick up L-2 (6–7–8) in the right column and the operation of this latch, followed by L-3 (6–7) would complete the operations required. In either event, the transfer of data into the tenth column of the Storage Matrix causes the –& 10 unit to reset all STR and P units to terminate the operation.

The stretch of seven- and eight-column video patterns is similarly controlled by STR units 7 and 8 and is accomplished by the operation of the latches in the right column only.

It will be apparent from the foregoing description, that the present invention provides an improved character recognition system in which the binarized video data secured by scanning characters is transformed within a Storage Matrix to provide patterns which are more readily analyzed with an economy of recognition circuitry.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a character recognition system, the combination comprising a. scanning means for scanning the characters to be recognized and providing binarized video data corresponding to the scanned character, b. a two-dimensional storage matrix comprising a plurality of binary storage elements arranged in columns and rows, said storage matrix being connected to said scanning means to receive and store said binarized video data, c. registration means connected to said storage matrix and said scanning means for aligning said video data in said matrix with respect to the boundaries of said matrix and selected storage elements from which critical characteristics of the data may be extracted, d. transform means connected to said selected storage elements of said matrix for extracting and consolidating said video data located in peripheral areas of said matrix, comprising a plurality of logic elements connected to selected pairs of storage elements in said matrix in peripheral locations of said matrix for combining the video data contained in the associated peripheral storage elements, e. switching means connected to said transform means and said matrix for returning data consolidated by said transform means to a plurality of selected elements in said storage matrix in locations radially inward from the peripheral areas of said storage matrix, and f. logic circuit means connected to said radially inward locations in said matrix for providing outputs indicative of the characters scanned.

2. A character recognition system as claimed in claim 1, further including a second transform means connected to receive data stored in said matrix in said radially inward locations, comprising a plurality of logic elements connected to selected pairs of storage elements located in said radially inward locations, for combining the video data contained in said storage elements, second switching means connected to said record transform means for returning data consolidated by said second transform means to a second plurality of selected elements in said storage matrix in locations still further radially inward than the location from which said data was combined by said second transform means, and logic circuit means connected to said second plurality of elements for providing outputs indicative of the characters scanned.

3. A character recognition system as claimed in claim 1, further including registration means comprising first and second counter means connected to said scanning means for relating the position of said video data on a current scan with the position of video data on a prior scan.

* * * * *

PO-1050
(5/69)

UNITED STATES PATENT OFFICE
CERTIFICATE OF CORRECTION

Patent No. 3,629,833 Dated December 21, 1971

Inventor(s) Frederick M. Demer

It is certified that error appears in the above-identified patent and that said Letters Patent are hereby corrected as shown below:

On the cover sheet, following field 45, field 73 should be added to read --[73] Assignee International Business Machines Corporation, Armonk, New York--.

In the specification, Column 3, line 4, "18bq" should read --18d--.

Signed and sealed this 25th day of July 1972.

(SEAL)
Attest:

EDWARD M. FLETCHER, JR.
Attesting Officer

ROBERT GOTTSCHALK
Commissioner of Patents